(12) United States Patent
Chen et al.

(10) Patent No.: US 7,712,765 B2
(45) Date of Patent: May 11, 2010

(54) STROLLER HAVING A SINGLE FOLDING SHAFT

(75) Inventors: Shun-Min Chen, Taipei (TW); Jian-Qun Li, Taipei (TW)

(73) Assignee: Wonderland NurseryGoods Co., Ltd., Neihu, Taipei (TW)

( * ) Notice: Subject to any disclaimer, the term of this patent is extended or adjusted under 35 U.S.C. 154(b) by 251 days.

(21) Appl. No.: 11/864,933

(22) Filed: Sep. 29, 2007

(65) Prior Publication Data

US 2008/0093824 A1    Apr. 24, 2008

Related U.S. Application Data

(60) Provisional application No. 60/862,457, filed on Oct. 22, 2006.

(51) Int. Cl.
*B62B 1/00* (2006.01)

(52) U.S. Cl. .................. 280/642; 280/647; 280/658

(58) Field of Classification Search ........... 280/641, 280/642, 643, 647, 648, 650, 655, 657, 658, 280/47.371, 47.38, 47.4
See application file for complete search history.

(56) References Cited

U.S. PATENT DOCUMENTS

| | | | |
|---|---|---|---|
| 4,216,974 A * | 8/1980 | Kassai | 280/42 |
| 4,834,403 A | 5/1989 | Yanus | |
| 5,772,279 A * | 6/1998 | Johnson, Jr. | 297/130 |
| 6,095,548 A | 8/2000 | Baechler | |
| 6,513,827 B1 * | 2/2003 | Barenbrug | 280/648 |
| 7,234,722 B1 * | 6/2007 | Madigan et al. | 280/642 |
| 7,367,581 B2 * | 5/2008 | Yang | 280/642 |
| 7,377,537 B2 * | 5/2008 | Li | 280/650 |
| 2008/0191451 A1 * | 8/2008 | Driessen | 280/650 |

FOREIGN PATENT DOCUMENTS

| | | |
|---|---|---|
| EP | 1 503 095 A1 | 2/2005 |
| GB | 2 418 179 A | 3/2006 |
| WO | WO2004097282 A1 | 11/2004 |
| WO | 2005/054031 A1 | 6/2005 |
| WO | WO2006031111 A2 | 3/2006 |

\* cited by examiner

*Primary Examiner*—Hau V Phan
(74) *Attorney, Agent, or Firm*—Winston Hsu

(57) ABSTRACT

A stroller utilizes a handle folding assembly and a front frame folding assembly for a compact, easy storing folded size. An axle of the handle folding assembly rotates when a wrench is operated with single hand and two first sliders are brought to approach axially to each other and detach from two fastening elements, making the handle rotatable and folding to a rear frame. A button of the front frame folding assembly is pressed with single hand (or a seat is detached from a seat bracket) to detach a second slider of the front frame from a roller to make the front frame rotatable and folding to the rear frame. The position pins accompanied with a plurality of position holes enable the stroller an adjustable height of a seat and the handle.

19 Claims, 24 Drawing Sheets

STROLLER HAVING A SINGLE FOLDING SHAFT

CROSS REFERENCE TO RELATED APPLICATIONS

This application claims the benefit of U.S. Provisional Application No. 60/862,457, which was filed on Oct. 22, 2006 and is incorporated herein by reference.

BACKGROUND OF THE INVENTION

1. Field of the Invention

The present invention relates to a stroller and a folding assembly, and more specifically, to a stroller and a folding assembly having a single folding shaft.

2. Description of the Prior Art

Most strollers have folding mechanism so that the strollers can be folded into a smaller size for transportation convenience. Please refer to the stroller 100 according to the prior art in FIG. 1 and FIG. 2. When folding the stroller, a user has to rotate and fold the backrest frame 110 relative to the seat frame 120 first and operate the release device 135 located at both side of the handle 130 concurrently such that the handle 130 can be rotated toward the front frame 140. Then the user holds the rear frame 150 and the latch 160 connecting to the front frame 140 so that the rear frame 150 can be detached from the rest of the stroller body and able to pivotally rotate toward the front frame 140 relative to the front frame 140. The stroller 100 is finally folded to a smaller size as FIG. 2 shows.

The folding process of the stroller in the prior art, however, is quite complicated since to operate the release device 135 at both sides of the stroller requires a two-hand operation and for those who have to take of the baby inside the stroller in the meantime, it is very inconvenient that he/she has to fold the stroller with two hands. On the other hand, it also requires the user to make effort to pull the latch 160 for detaching the rear frame 150 from the stroller body to completely fold the stroller, which is not a satisfied operation for frequent folding. Additionally, most strollers according to the prior art are not equipped with functions for adjusting the heights of the seat or the handle, adding to more inconvenience for users with various heights and figures.

SUMMARY OF THE INVENTION

The present invention provides a stroller. The stroller comprises a handle comprising a handle sleeve, a front frame a rear frame comprising a rear sleeve, and a folding assembly. The front frame comprising a seat bracket for supporting a seat, a front sleeve connected to the seat bracket, and a second slider movably mounted on the seat bracket. The folding assembly comprises a roller and a fastening element. The roller has a first position opening and at least a first slider movably mounted on the roller. The fastening element is fixed inside the handle sleeve. The roller passes through the handle sleeve, the front sleeve, and the rear sleeve for pivotally connecting to the handle and the front frame being rotating relative to the rear frame around the roller respectively or being locked by engaging the first slider with the fastening elements or the second slider with the first position opening respectively.

The present invention also provides a stroller frame. The stroller frame comprises a front frame, a rear frame, and a handle. The handle comprises a roller, a first locking device, and a second locking device. The roller is secured to the rear frame and the handle and the front frame pivotally connect to the rear frame via the roller respectively and are capable of rotating relative to the rear frame around the roller. The first locking device is mounted on the roller and movable relative to the roller between a first position where the first locking device is engaged with the handle and a second position where the first locking device is disengaged from the handle. The second locking device is mounted on the front frame and movable relative to the front frame between an engaged position where the second locking device is locked with the roller and a disengaged position where the second locking device is removed from the roller.

These and other objectives of the present invention will be understood to those of ordinary skill in the art after reading the following detailed description of the preferred embodiment that is illustrated in the various figures and drawings.

DETAILED DESCRIPTION

Figure 1:
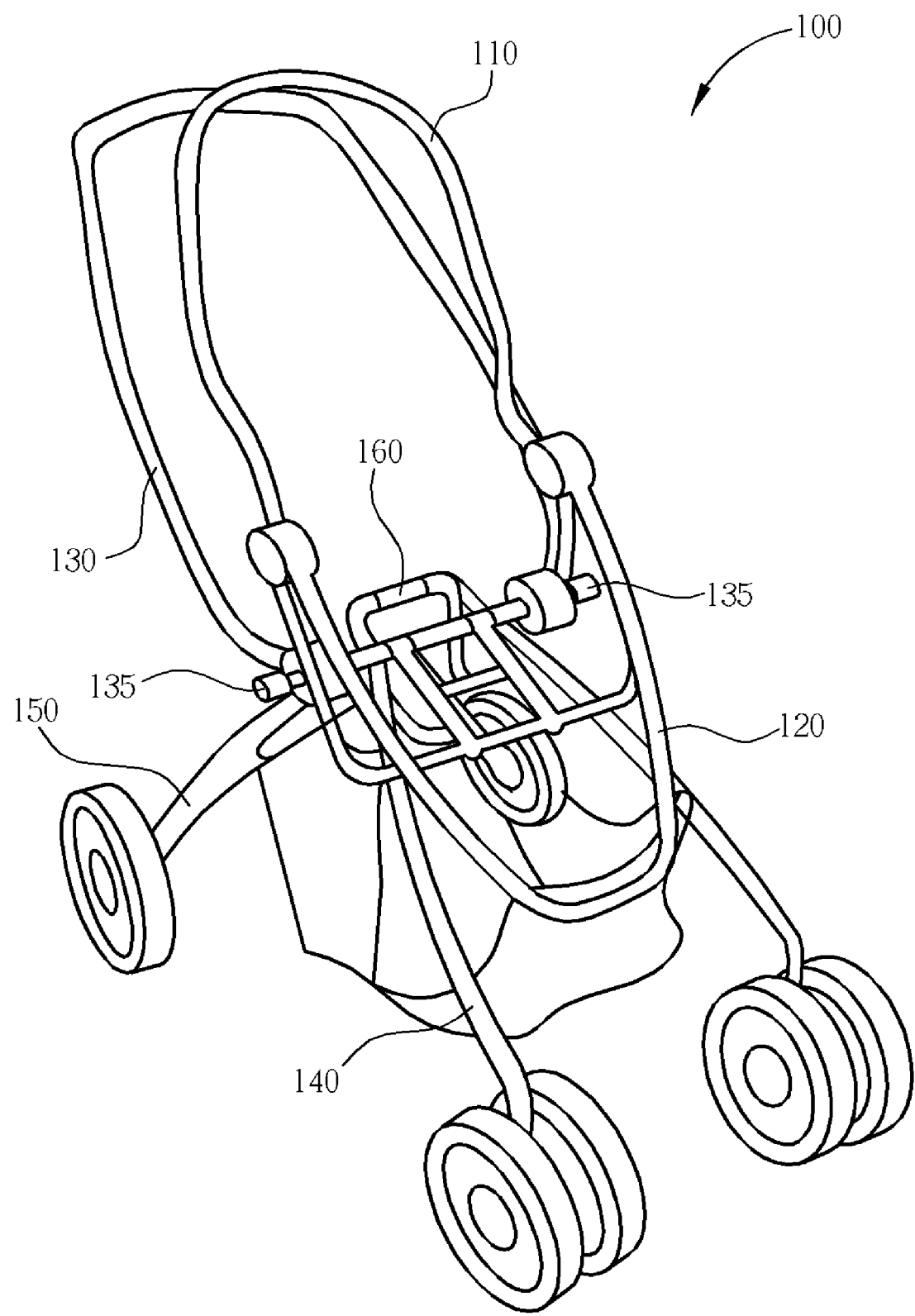
FIG. 1 and FIG. 2 are illustrations of a stroller according to the prior art illustrating an opened status and a folded status respectively.
Figure 2:
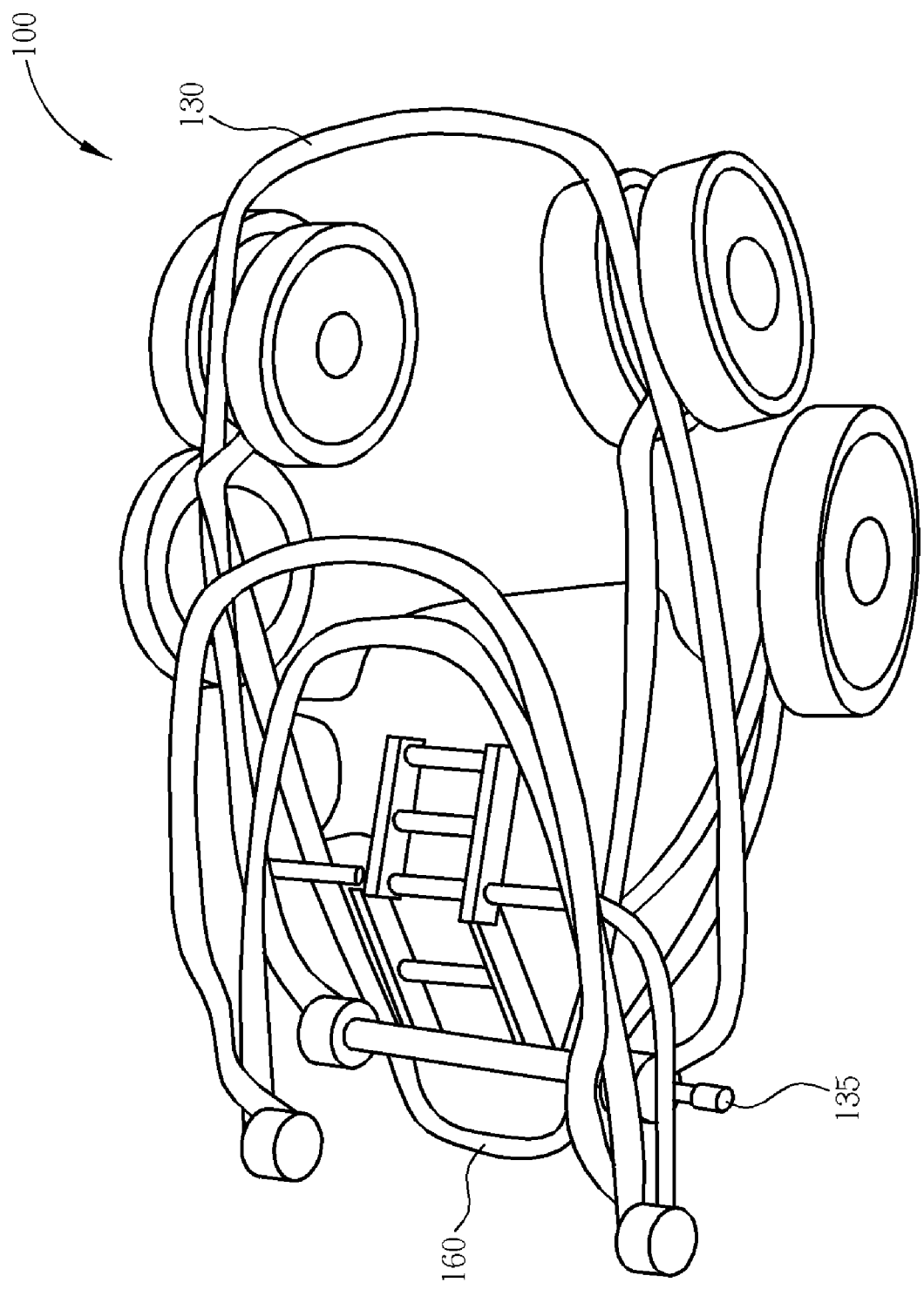
Figure 3:
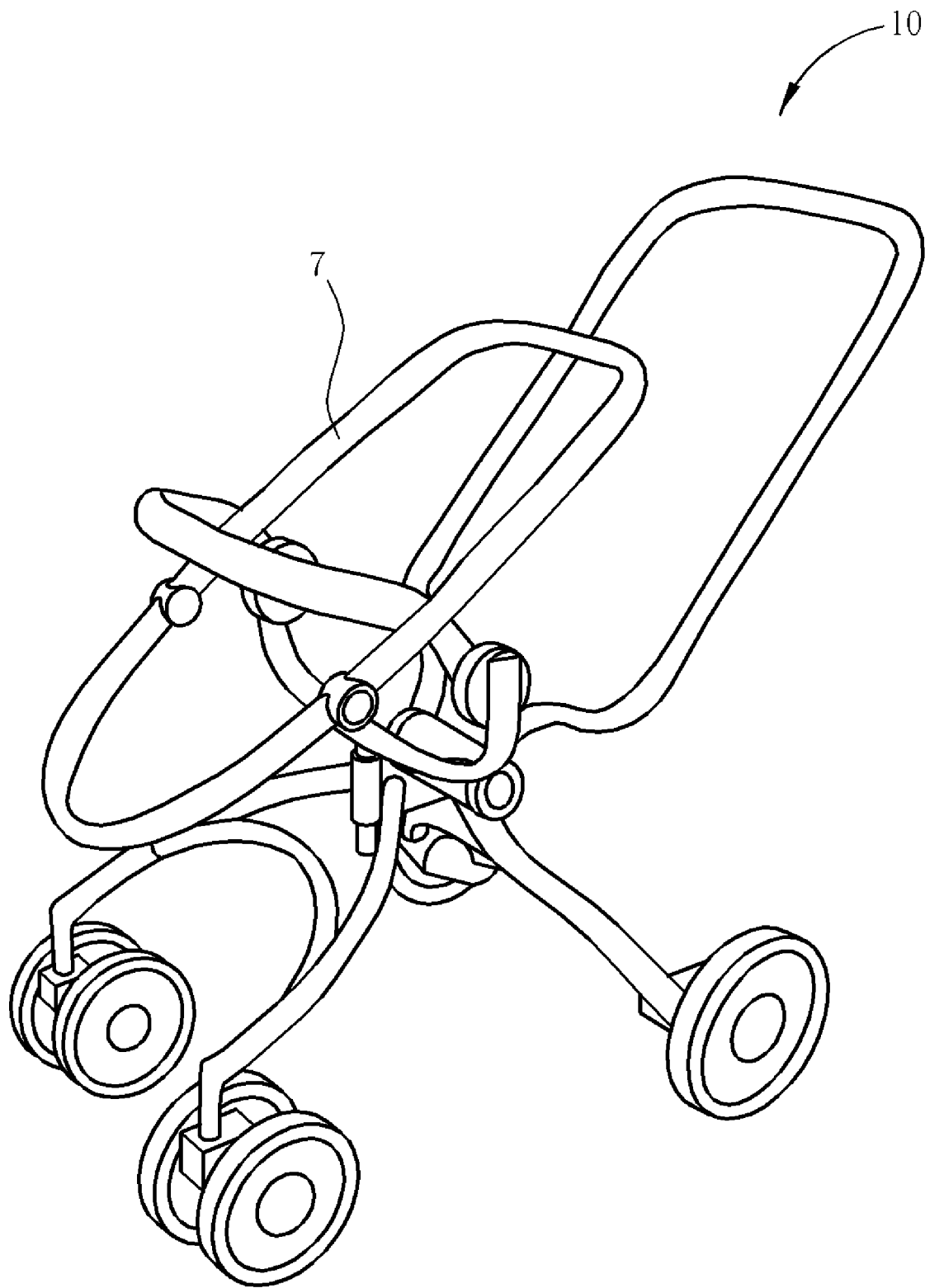
FIG. 3 is an illustration of the stroller frame according to the present invention in combination with a seat.
Figure 4:
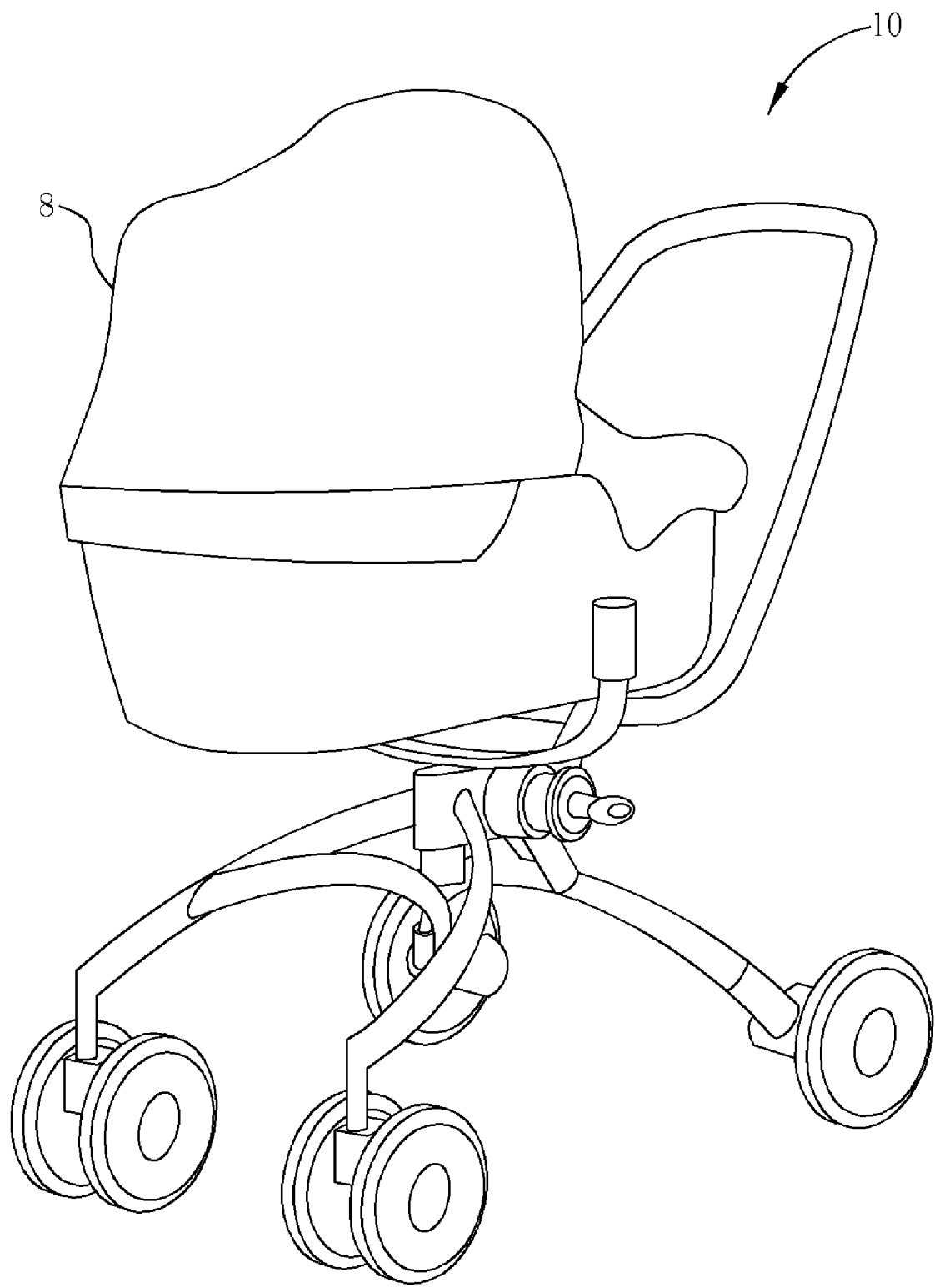
FIG. 4 is an illustration of the stroller frame according to the present invention in combination with a bassinet.

Please refer to FIG. 3 and FIG. 4, which are the illustrations of the stroller frame 10 according to the present invention in combination with a seat 7 and a bassinet 8 respectively. The seat 7 in FIG. 3 can be an infant car seat or an infant carrier and both the seat 7 and the bassinet 8 can be detachably configured in the stroller frame 10.

Figure 5:
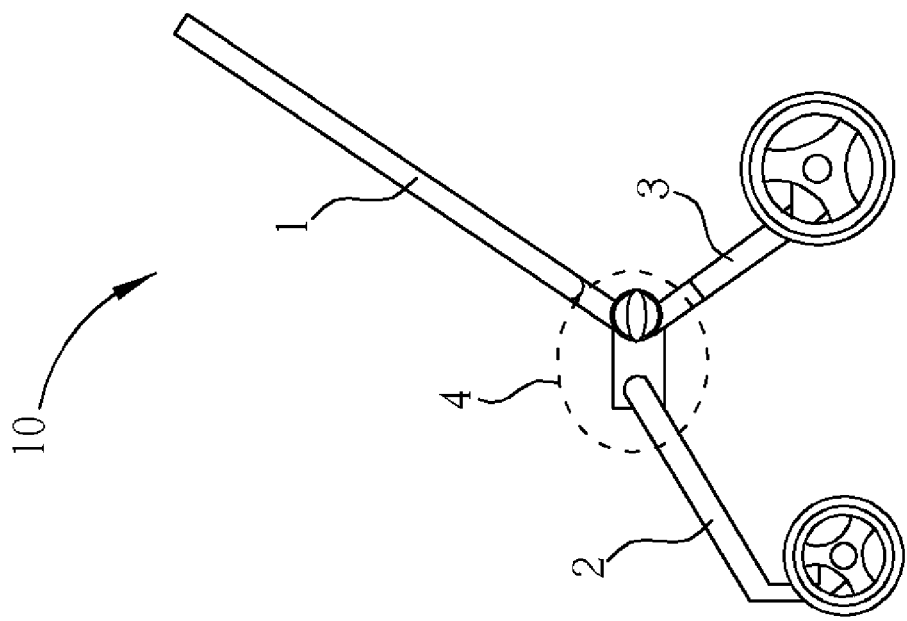
FIG. 5 to FIG. 7 are illustrations of the stroller frame according to the present invention when folded to a smaller size via a folding assembly.
Figure 6:
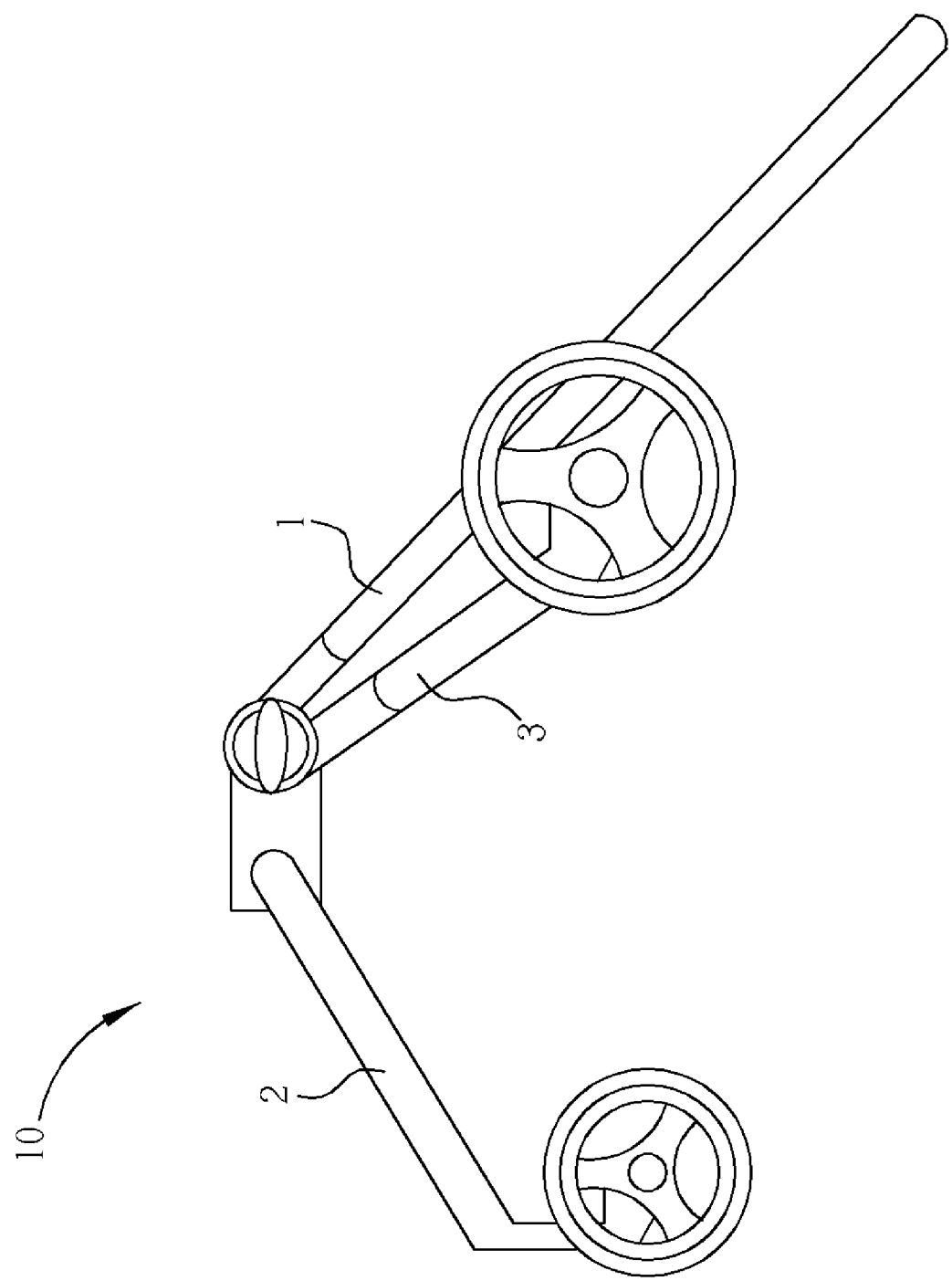
Figure 7:
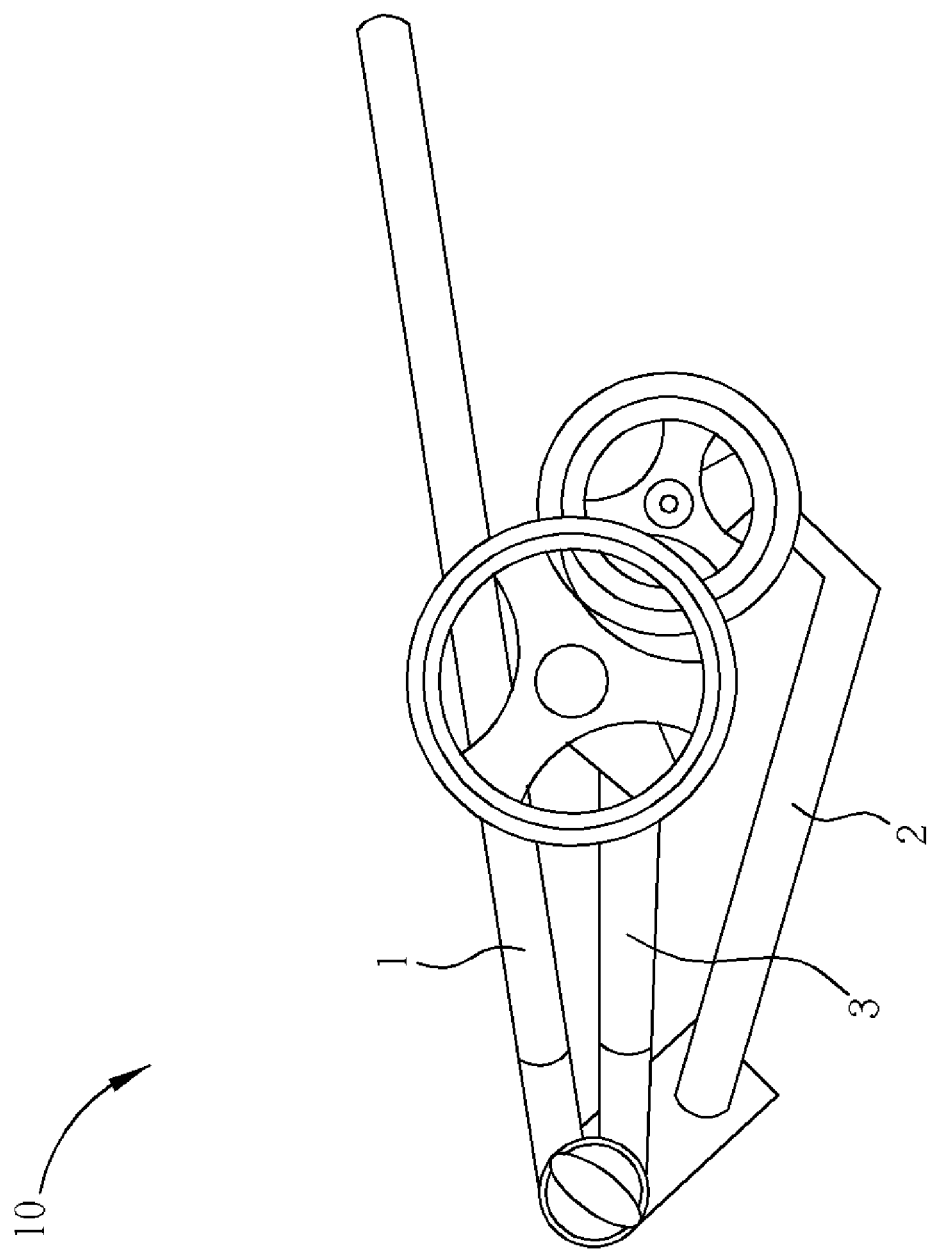

FIG. 5 to FIG. 7 are illustrations of the stroller frame 10 according to the present invention when folded to a smaller size with a folding assembly 4. FIG. 5 illustrates the stroller frame 10 with the seat 7 or the bassinet 8 removed. The stroller frame 10 comprises a handle 1, a front frame 2, a rear frame 3, and a folding assembly 4. The stroller frame 10 can be fully opened (as FIG. 5 shows), or the handle 1 folded with the rear frame 3 (as FIG. 6 shows), or the handle 1 and the front frame 2 folded with the rear frame 3, by operating the folding assembly 4 to lock or unlock each part of the stroller frame 10.

Figure 8:
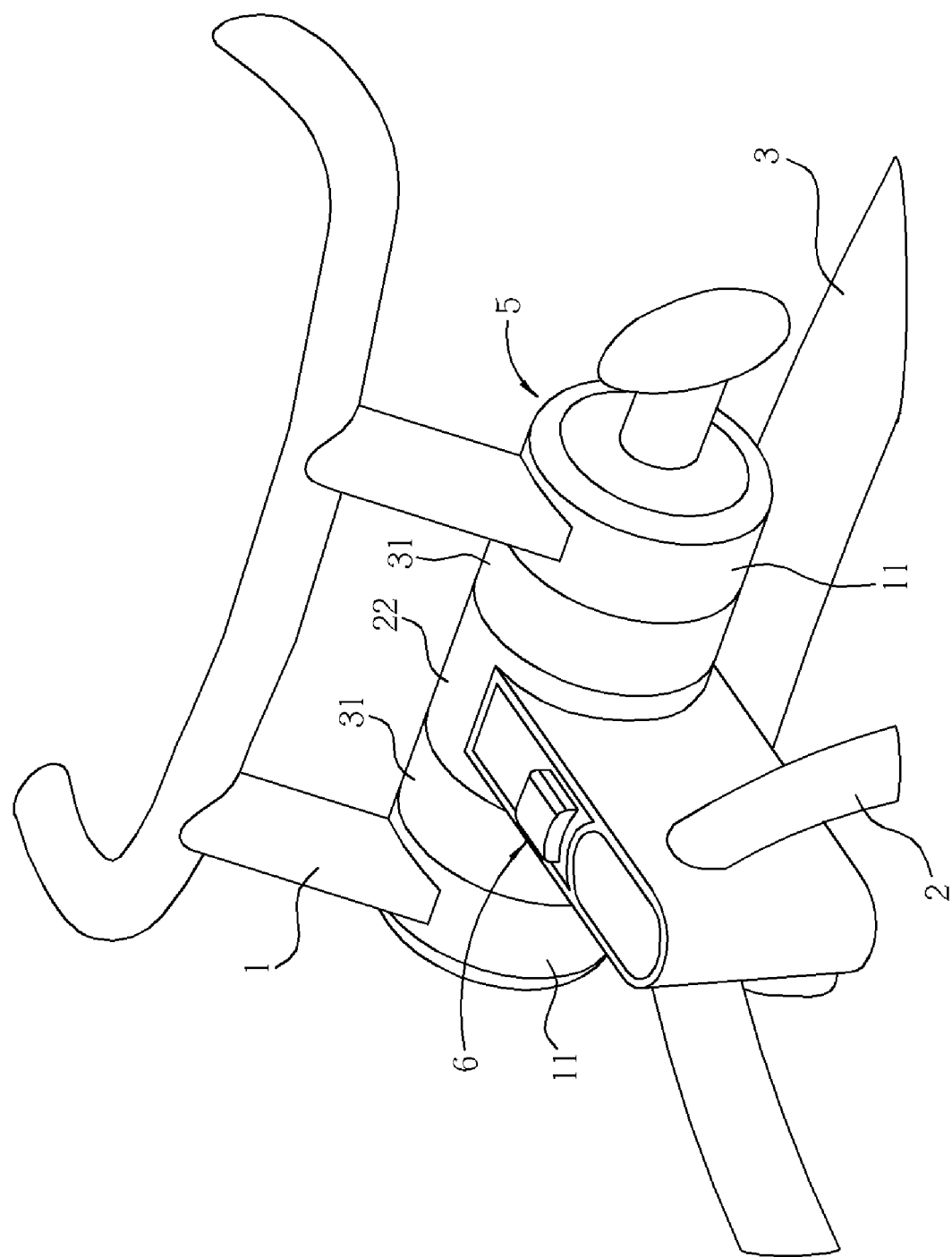
FIG. 8 is an illustration of the folding assembly according to the present invention.
Figure 9:
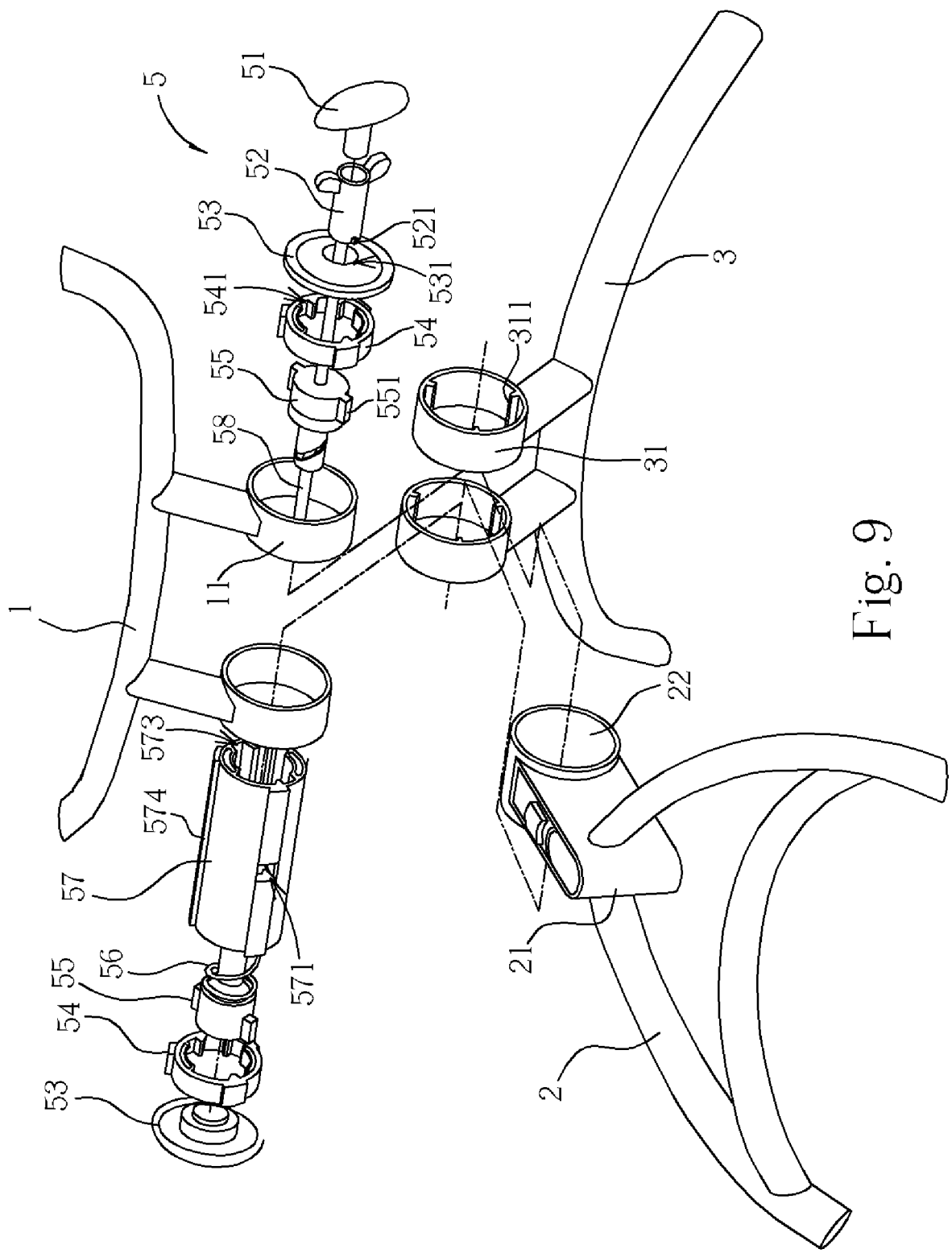
FIG. 9 is an illustration of the exploded view of each component in FIG. 8.
Figure 16:
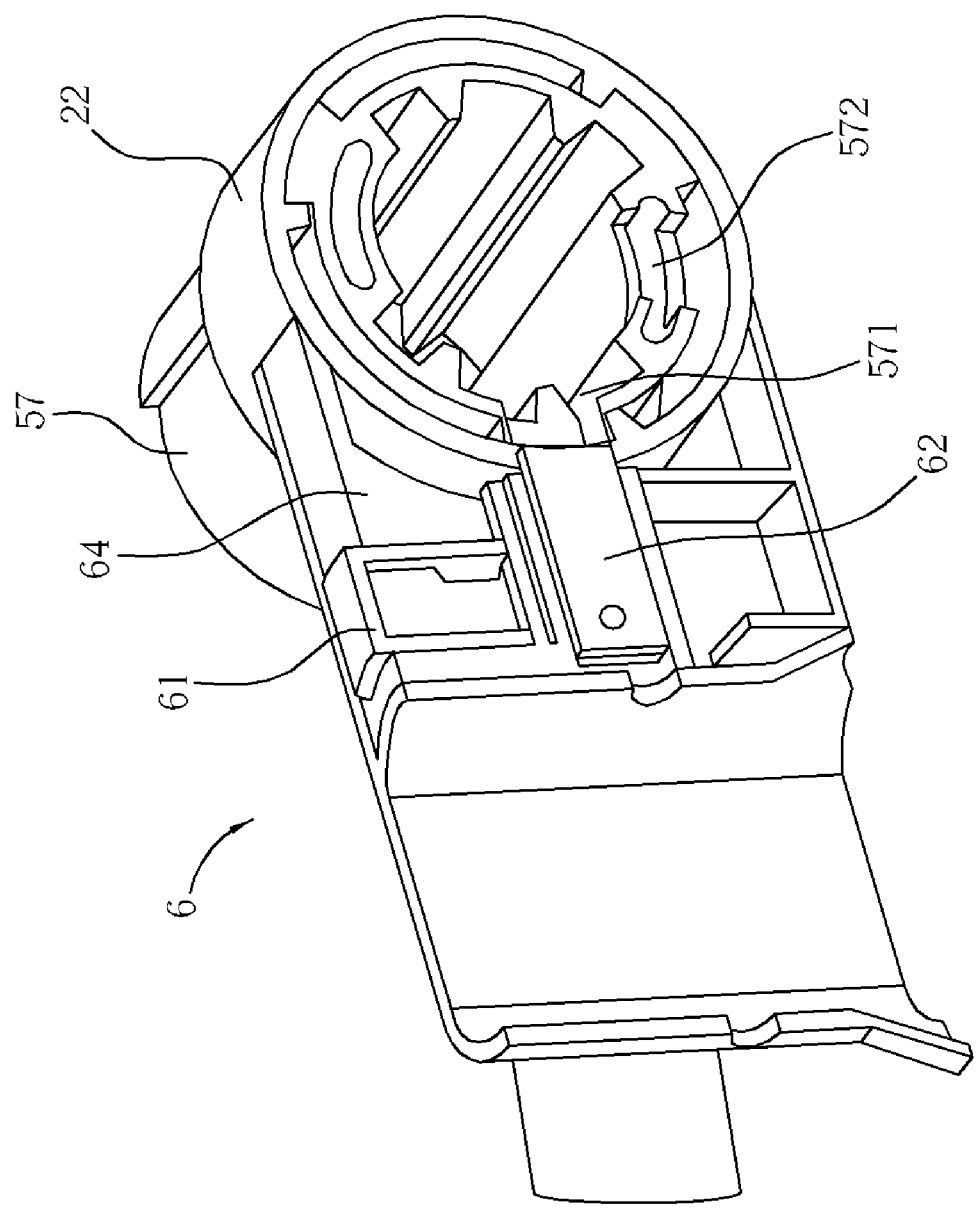
FIG. 16 and FIG. 17 are illustrations of the front frame folding assembly in a release status and in a locking status.

Please refer to FIG. 8. The folding assembly 4 comprises a handle folding assembly 5 and a front frame folding assembly 6. Please also refer to FIG. 9, which is an illustration of the exploded view of each component in FIG. 8. The handle 1 comprises two handle sleeves 11 configured at the front of the handle 1, the front frame 2 comprises a seat bracket 21 and a front sleeve 22 at the back of the front frame 2, and the rear frame 3 comprises two rear sleeves 31. The handle folding assembly 5 is in a form of shaft passing through the handle sleeves 11, the front sleeve 22, and the rear sleeves 31 for locking the handle 1, the front frame 2, and the rear frame 3. The handle folding assembly 5 also serves as an axis and allows the handle 1 and the front frame 2 for rotating relative to the rear frame 3 when folding the stroller frame 10. The handle folding assembly 5 comprises a wrench 51, a safety lock 52, two covers 53, two fastening elements 54 two first sliders 55, a spring 56, a roller 57, and an axle 58, wherein the axle 58 passes through all the other elements of the handle folding assembly 5. The spring 56 connects to the two first sliders 55 with its two ends. Each of the fastening elements 54, which is in ring-shaped, comprising a fastening guide 541 at the inner wall and joins to the handle sleeves 11. Because the handle sleeves 11 are respectively connected to two ends of the roller 57, the fastening elements 54 abut to the ends of the roller 57. The front sleeve 22 of the front frame 2 is configured around the roller 57. A rear guide 311 is formed on inside peripheral of the rear sleeve 31 and engaged with a guider 574 protruding from the outer wall of the roller 57 such that the rear sleeve 31 joins the roller 57 or alternatively, the rear sleeve 31 of the rear frame 3 joins the roller 57 via a connector (such as a rivet, which is not shown in the figure). The roller 57 is hollow and further has a first position opening 571, a second position opening 572 on the wall, which is shown in FIG. 16, and an inner guide 573 formed at the inner peripheral wall. When the roller 57 assembled with the first sliders 55 at two ends and the spring 56 between the first sliders 55, the axle 58 passes through the covers 53, the fastening elements 54 and the roller 57 and being mounted with the safety lock 52 at one end and links with the first sliders 55 and the spring 56. The roller 57 passes through the handle sleeves 11, the front sleeve 22, and the rear sleeves 31 for pivotally connecting the handle 1, the front frame 2 and the rear frame 3 with each other, which allows the handle 1 and the front frame 2 for rotating relative to the rear frame 3 around the roller 57 respectively.

Figure 10:
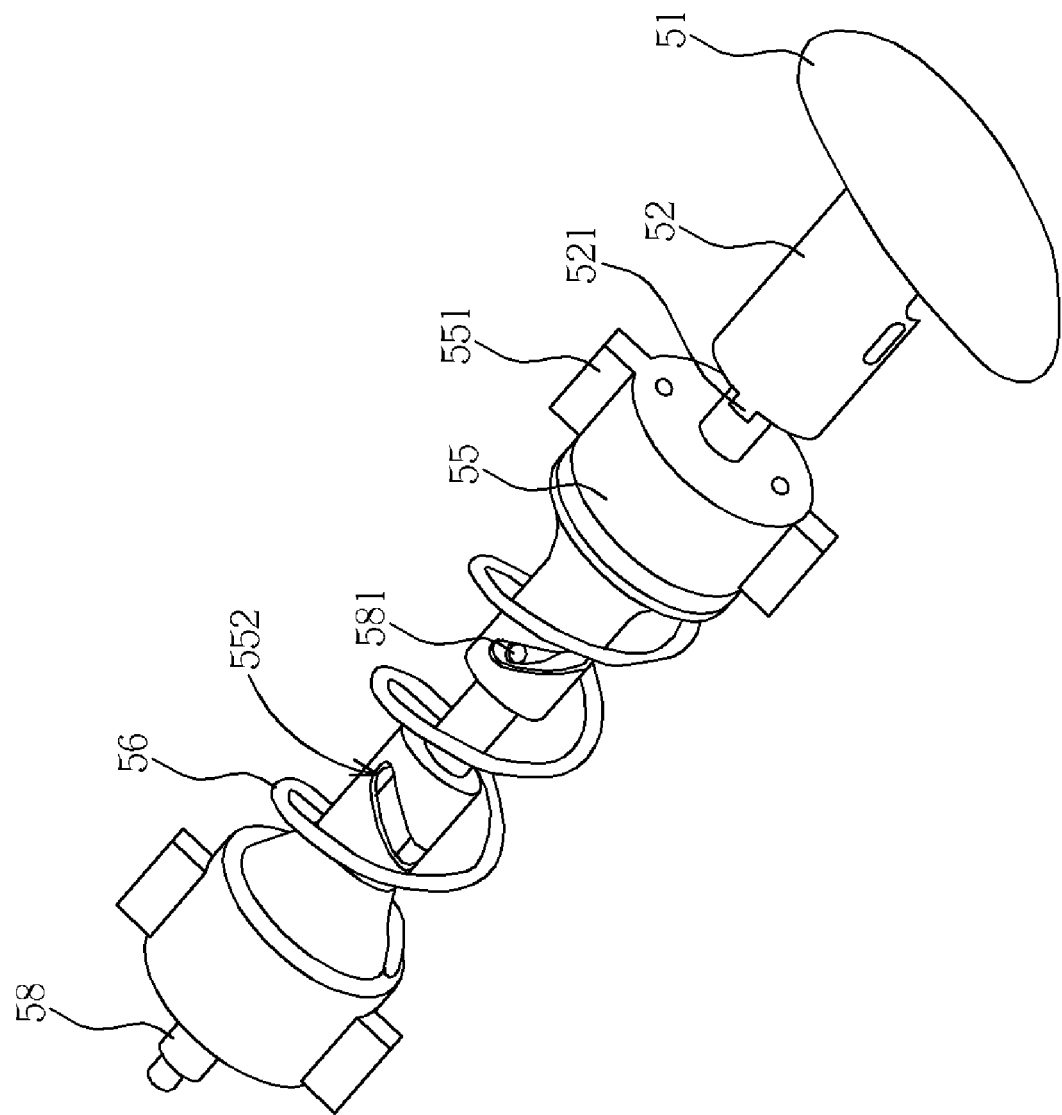
FIG. 10, FIG. 12, and FIG. 14 are illustrations of the sliders in the handle folding assembly when the handle is fixed in a locked status.
Figure 11:
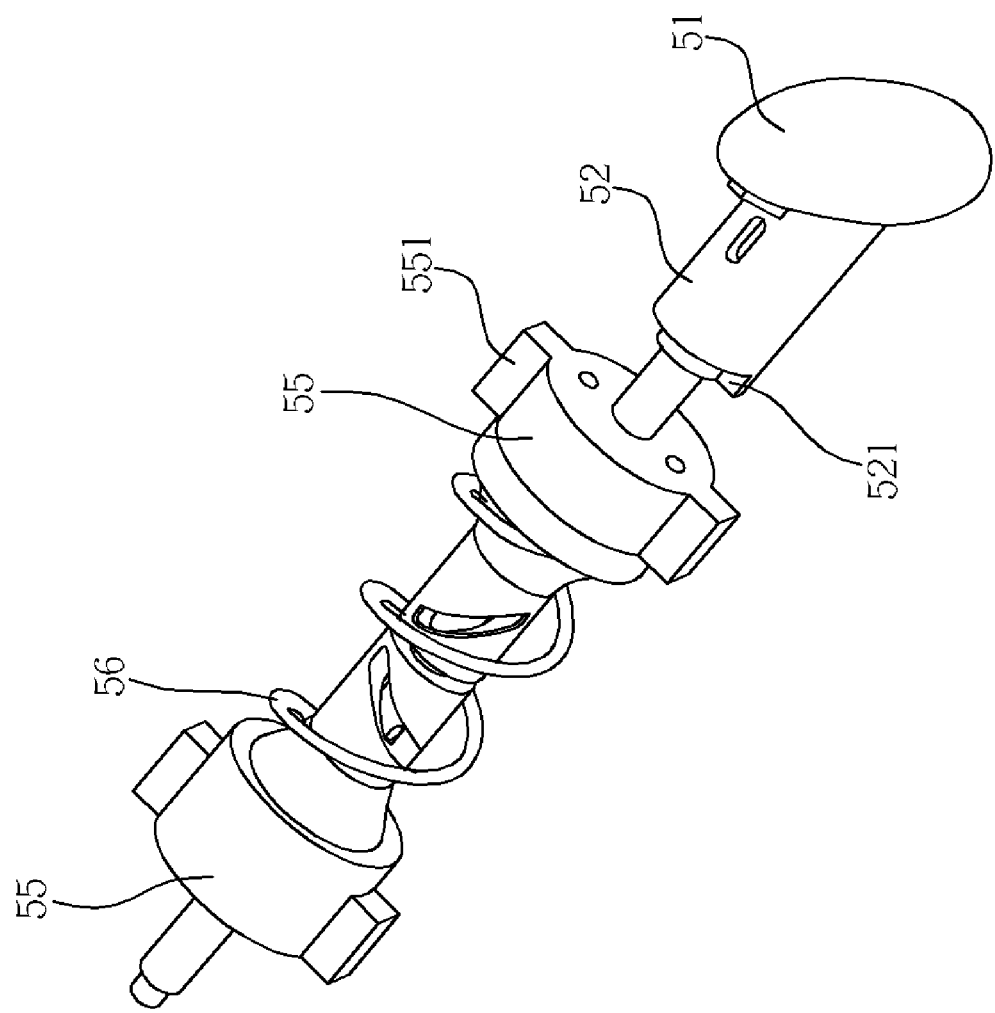
FIG. 11, FIG. 13, and FIG. 15 are illustrations of the sliders disengaging with the fastening elements when folding the handle.
Figure 12:
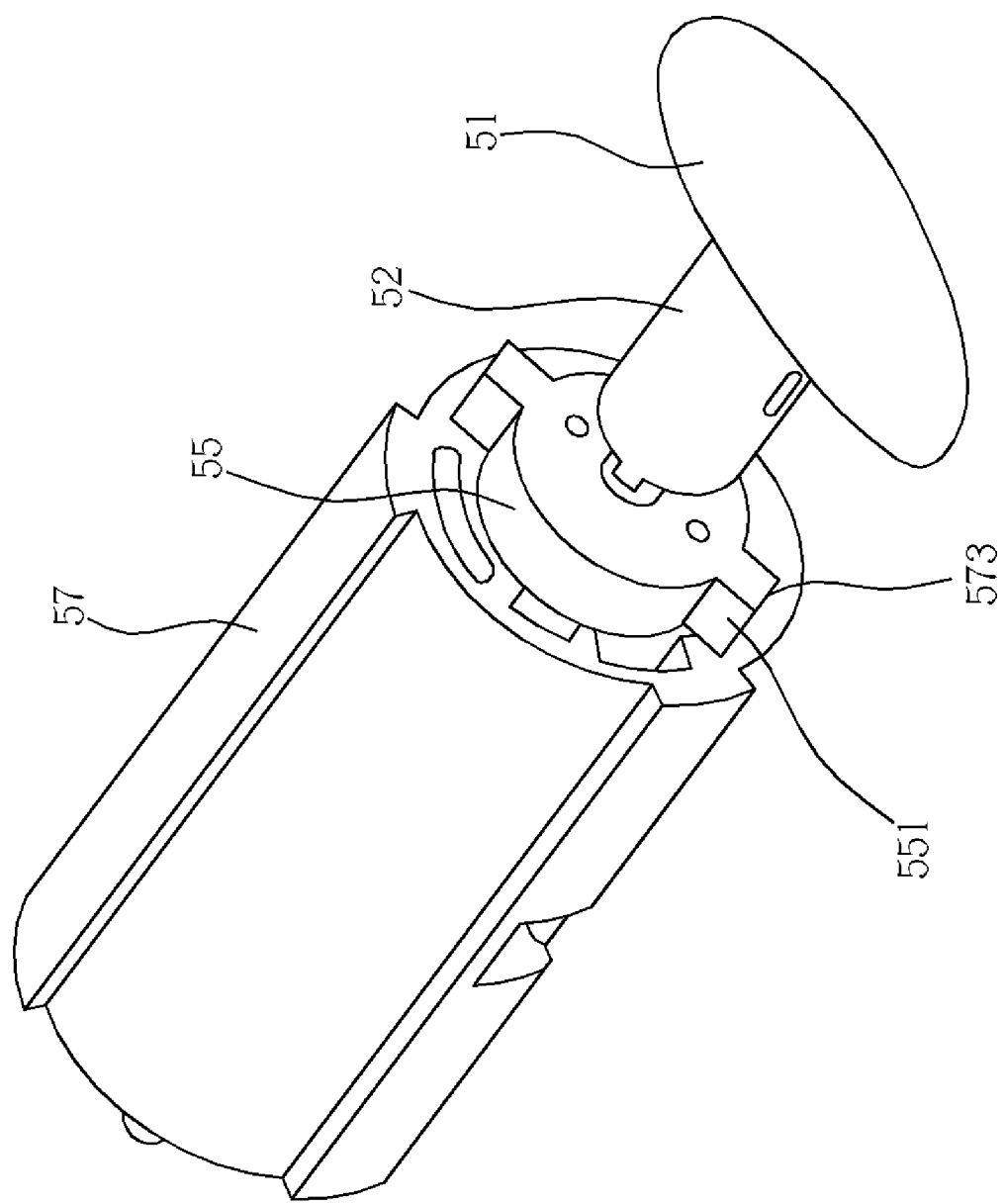
Figure 13:
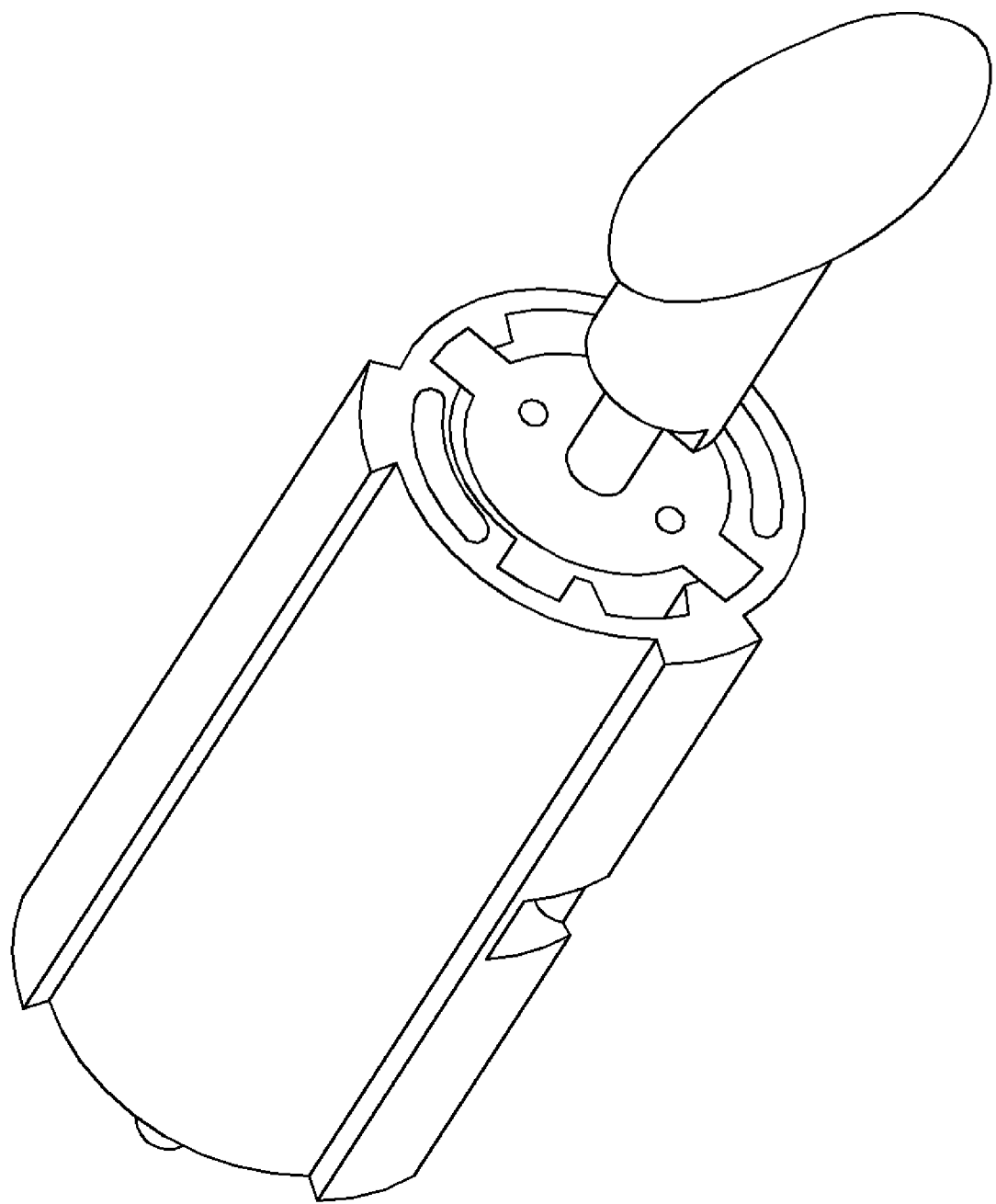
Figure 14:
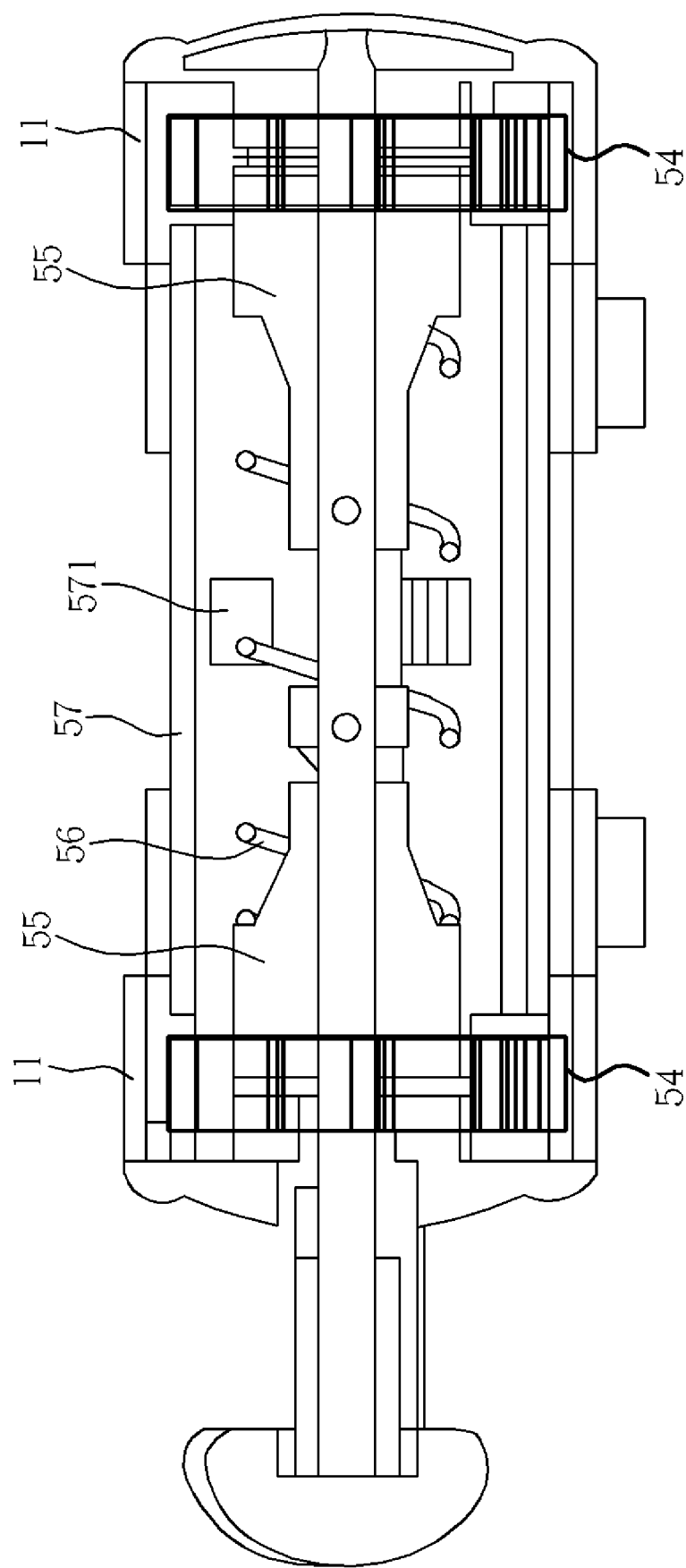
Figure 15:
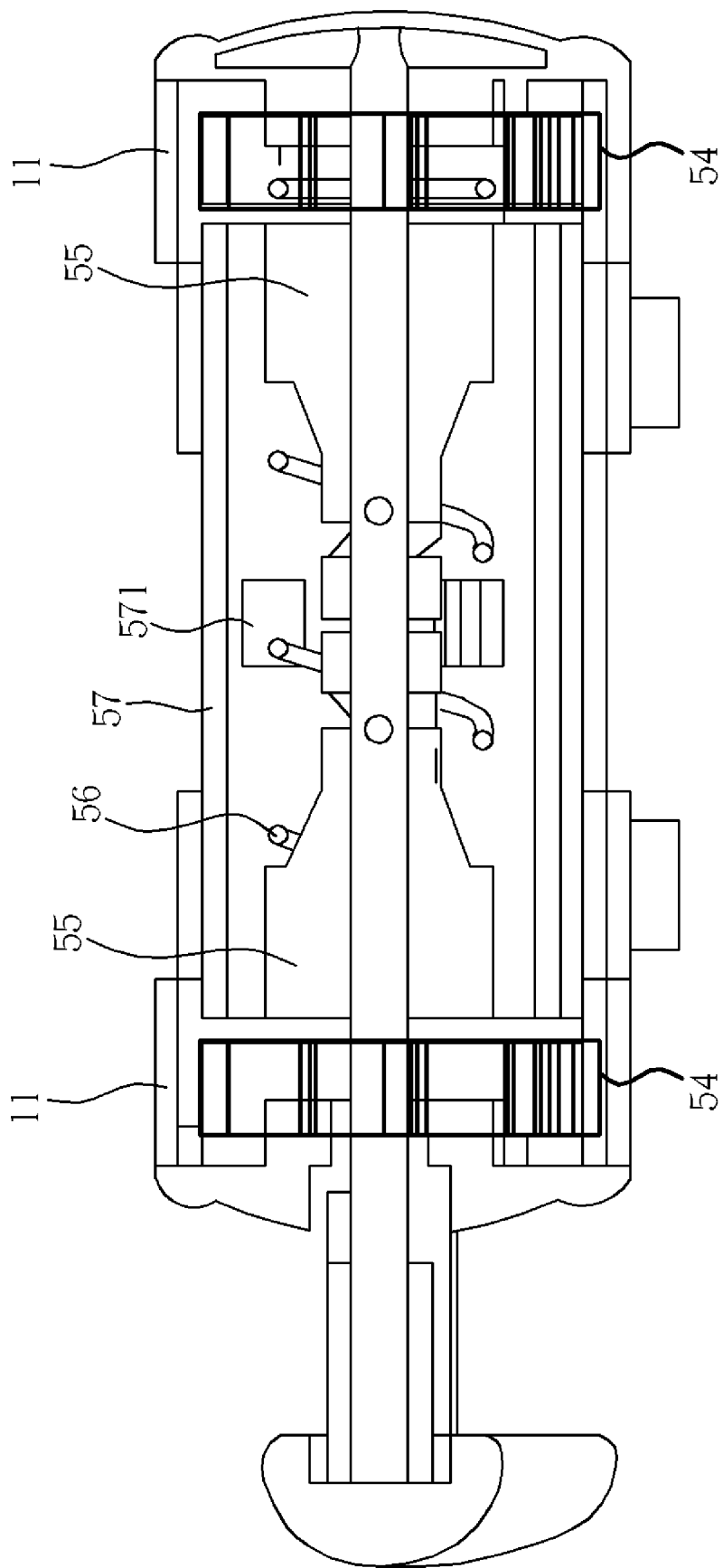

Please refer to FIG. 10 to FIG. 15. The handle 1 and the rear frame 3 of the stroller frame 10 in the present invention assemble are locked relevant to each other when two first sliders 55 of the handle folding assembly 5 engage with the fastening elements 54. FIG. 10, FIG. 12, and FIG. 14 are illustrations of the first sliders 55 in the handle folding assembly 5 when the handle 1 maintains in a locked status, and FIG. 11, FIG. 13, and FIG. 15 are illustrations of the first sliders 55 disengaging from the fastening elements 54 for folding the handle 1. When the handle 1 is in a locked status, the spring 56 pushes the two first sliders 55 away from each other and partly protruding from the roller to keep the first sliders 55 at each side of the roller 57 in a first position. A teeth 551 extending from the first slider 55 fits with the inner guide 573 of the roller 57 and moving along the inner guide 573. Since the first slider 55 is kept in the first position, part of the teeth 511 protrudes from the roller 57 and engages with the fastening guide 541 of the fastening elements 54, wherein the first sliders 55 and the fastening elements 54 as a whole may also be referred to a first locking device, so that the handle 1 is restricted to rotate relative to the rear frame 3 and therefore the handle 1 can maintain in the locked status by the first locking device.

If the handle 1 is going to fold, moving the safety lock 52 toward the wretch 51 along the axle 58 firstly, as FIG. 11, FIG. 13, and FIG. 15 show. A safety pin 521 of the safety lock 52 disengages with a ditch 531 of the cover 53, which is fixed with the handle sleeve 11, and the wrench 51 can move and rotate the safety lock 52 and the axle 58. To provide more safety for the stroller frame 10 in the present invention, the safety pin 521 inherently snaps into the ditch 531 for preventing unintentionally wrench 51 rotating and unlocking the stroller frame 10. In one exemplary embodiment of the present invention, each of the first sliders 55 comprises a groove 552 and the axle 58 comprises two pins 581 extending through the grooves 552 respectively. The grooves 552 are spiral shaped, and when the axle 58 rotates, the pins 581 rotate as well, which causes the first sliders 55 to move axially. Accordingly, the two first sliders 55 can either approach to each other or move away from each other, depending on the rotation direction of the axle 58. From the status in FIG. 10 to the status in FIG. 11, the pins 581 drive the first sliders 55 to approach to each other and slide to a second position, in which the first slider 55 retracts within the roller 57 and the teeth 551 of the first slider 55 slides along the inner guide 573 of the roller, thereof the teeth 511 disengage from the fastening elements 54 inside the handle sleeve 11, and therefore the handle 1 is unlocked and capable of rotating relative to the roller 57, or in other word, relative to the rear frame 3.

Figure 17:
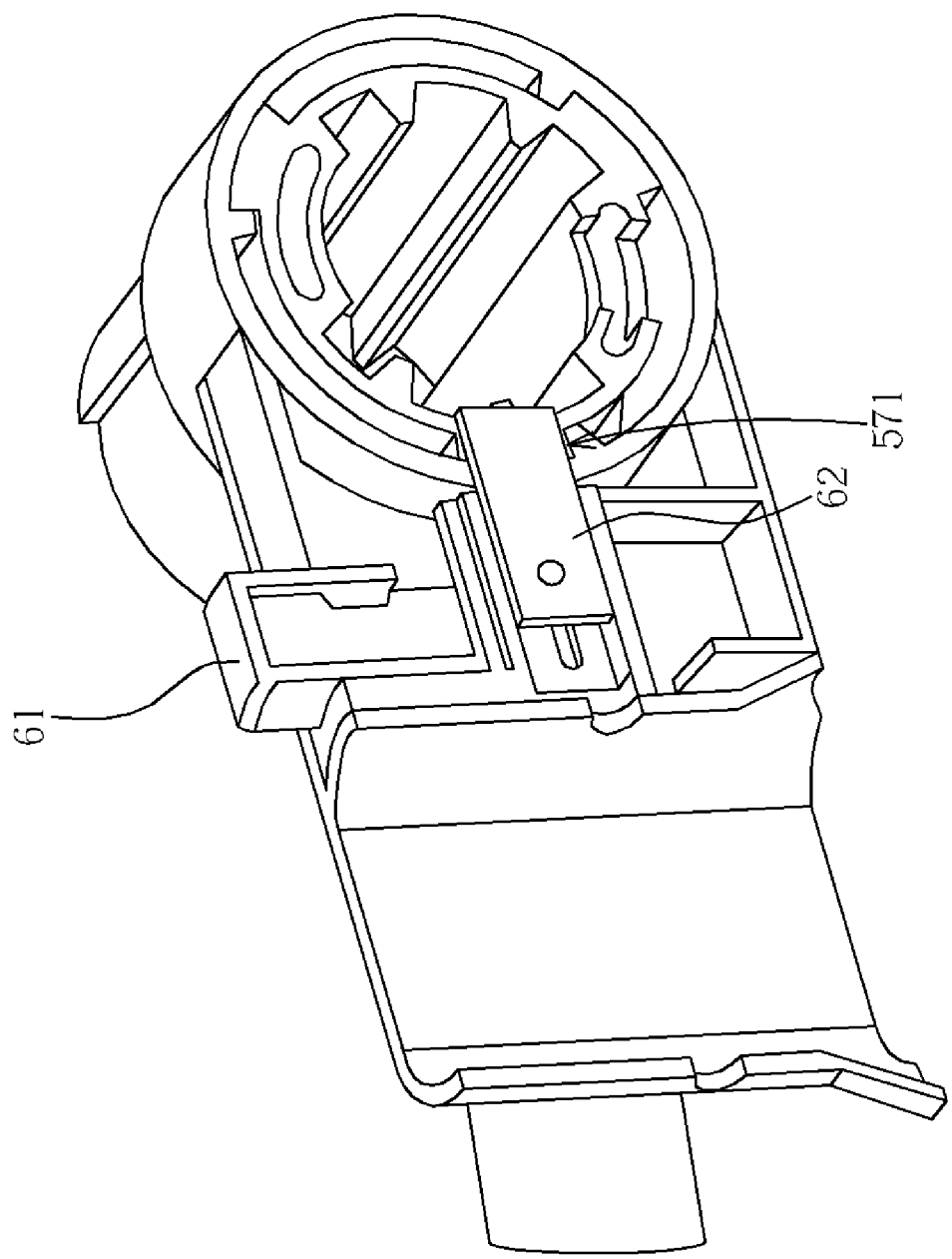

Please refer to FIG. 16 and FIG. 17 for illustrations of the folding movement of the front frame 2. In the first exemplary embodiment of the front frame folding assembly 6 of the present invention, a second slider 62 can engage with or disengage from the first position opening 571 or the second position opening 572 of the roller 57 such that the front frame 2 is locked on the rear frame 3 (as FIG. 17 shows) or released from the rear frame 3 (as FIG. 16 shows). The front frame folding assembly 6 comprises a button 61, a second slider 62, and a top cover 64. The second slider 62 is mounted on, capable of sliding along the seat bracket 21 and configured between the seat bracket 21 and the front sleeve 22. The button 61 is movably mounted the top cover 64. With use of the button 61, the second slider 62, which may also be referred to a second locking device, is moved between an engaged position which the second slider 62 is engaged with one of the first position opening 571 and the second position opening 572 of the roller 57 or a disengaged position which the second slider 62 is disengaged from one of the first position opening 571 and the second position opening 572. The front frame 2 can be locked in an extending position in that the front frame 2 is incapable of rotating relative to the rear frame 3 when the second slider 62 engages with the first position opening 571 of the roller 57. By pressing the button 61, the second slider 62 disengages with the first position opening 571 of the roller 57, the front frame 2 is capable of rotating relative to the roller 57, i.e. to the rear frame 3, until the front frame 2 reaches to a folded position, which in this position, the second slider 62 is positioned right at the second position opening 572 and a spring (not shown in the figure) of the front frame folding assembly 6 exerts a force to push the second slider 62 to engage with the second position opening 572 of the roller 57, the front frame 2 again in the locked status relative to the roller 57. Finally, pressing the button 61 just disengages the second slider 62 from the second position opening 572 so that the front frame 2 is free to rotate again.

The handle folding assembly 5 and the front frame folding assembly 6 aforementioned are assembled on a single roller 57 and therefore, the folding assembly 4 of the stroller frame 10 assembles the stroller frame 10 by one single roller 57, which allows the handle 1 and the front frame 2 for engaging with or disengaging from the rear frame 3 and it only requires one hand to operate the wrench 51 or press the button 61.

Figure 18:
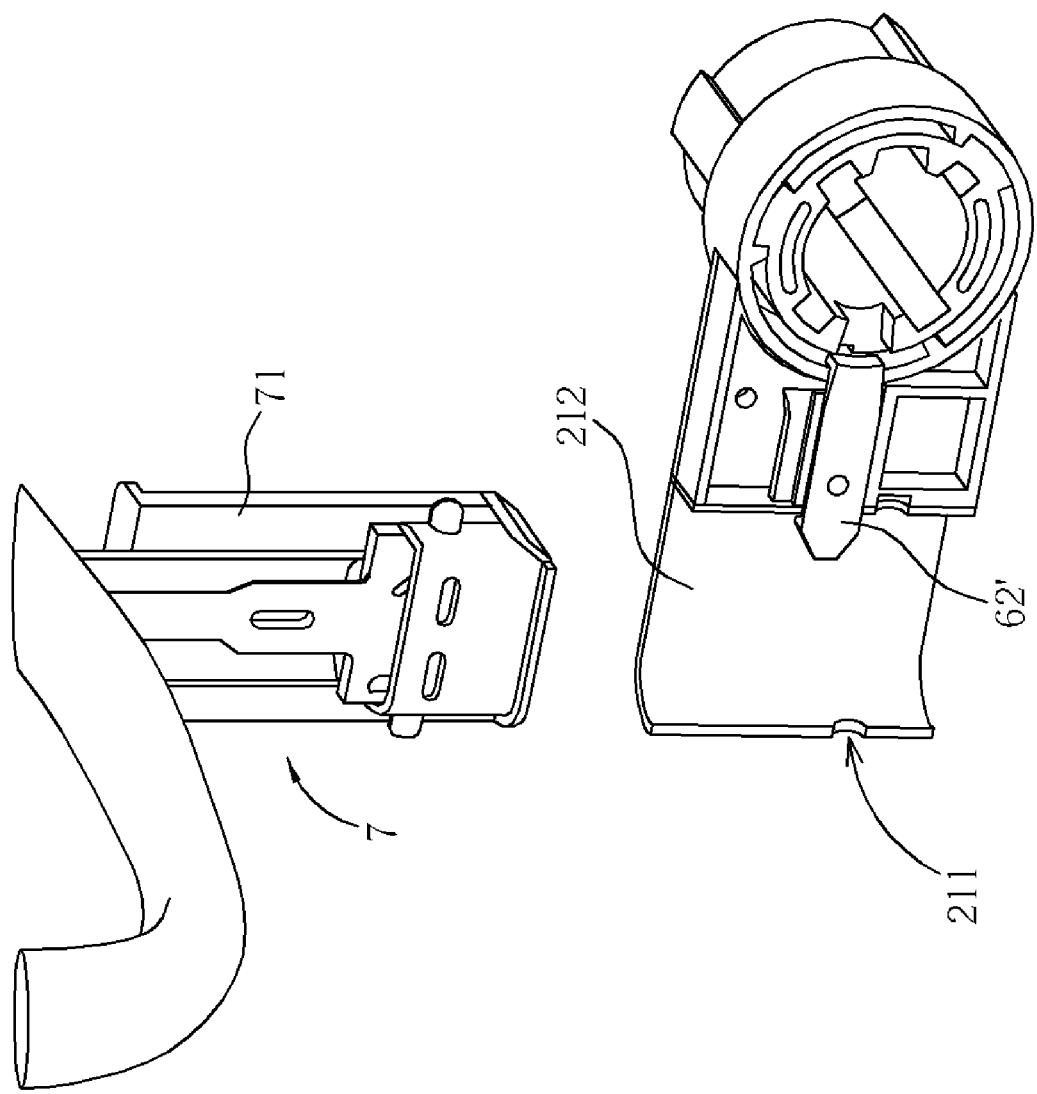
FIG. 18 and FIG. 19 are illustrations of a second exemplary embodiment of the front frame folding assembly according to the present invention.
Figure 19:
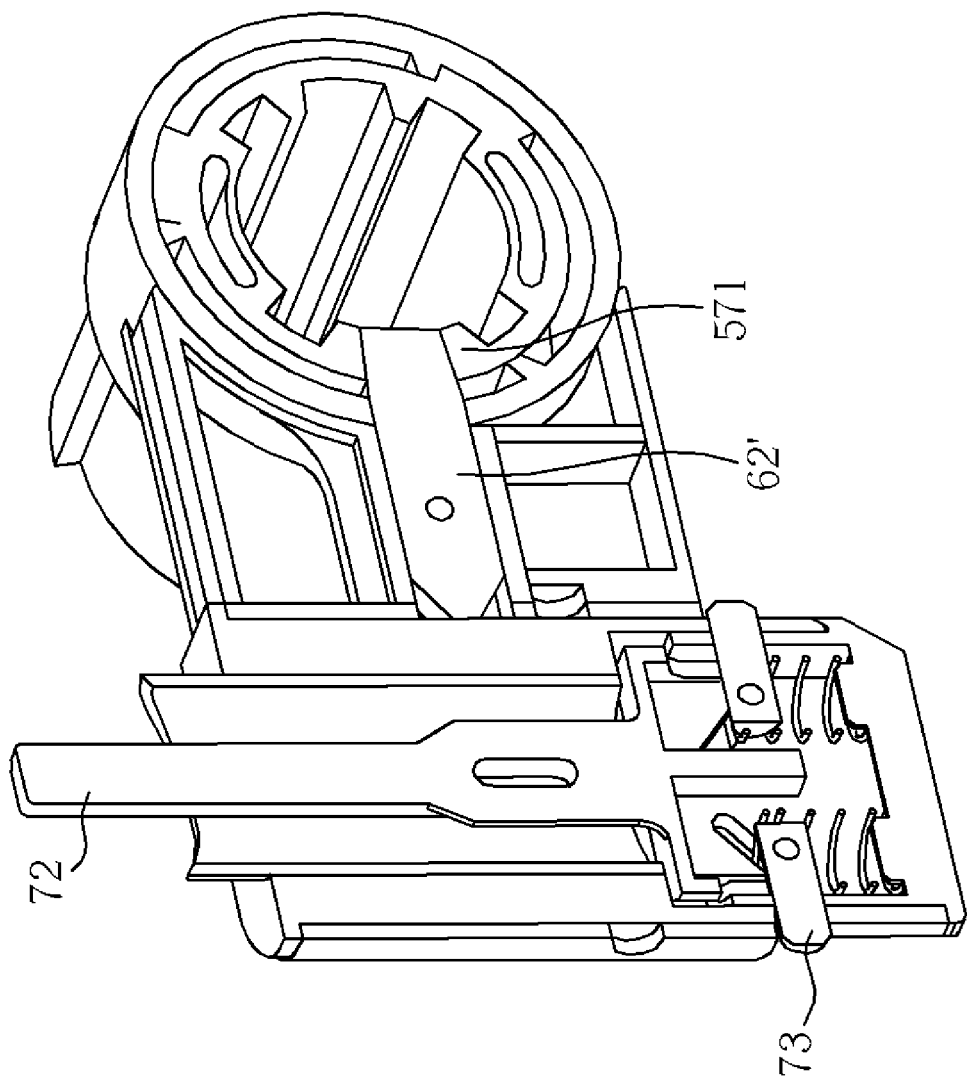

Please refer to FIG. 18 and FIG. 19 for illustrations of a second exemplary embodiment of the present invention. The front frame folding assembly 6 engages with the roller 57 by inserting the seat 7 or the bassinet 8 into the stroller frame 10 or disengages with the roller 57 by removing the seat 7 or the bassinet 8 from the stroller frame 10. The seat 7 or the bassinet 8 comprises a supporting device 71 detachable connected to a mounting slot 212 of the seat bracket 21 to support the seat 7 or bassinet 8 on the stroller frame 10. In this embodiment, the second slider 62' is biasing to the disengage position and projected into the mounting slot 212. The button 64 is omitted in this embodiment. When the seat 7 or bassinet 8 is mounted on the stroller frame 10, the supporting device 71 is inserted in the mounting slot 212 and the second slider 62' is driven by the supporting device 71 toward the first position opening 571 of the roller 57 to maintain the front frame 2 in a locked status. When the seat 7 or the bassinet 8 is removed from the seat bracket 21, the spring (not shown in the figure) of the front frame folding assembly 6 forces the second slider 62' to disengage with the first position opening 571 and the front frame 2 is capable of rotate relative to the roller 57 (or the rear frame 3) and folded.

Figure 20:
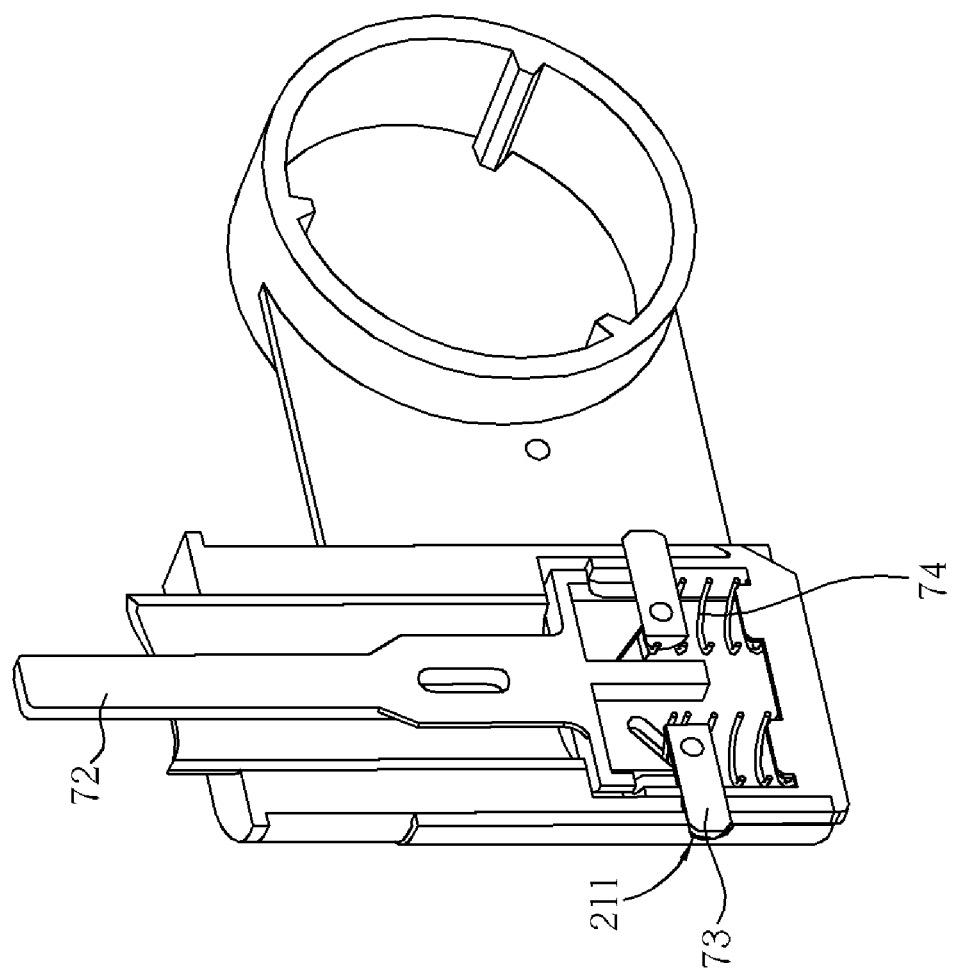
FIG. 20 is an illustration of a seat-adjusting device in the second exemplary embodiment of the front frame folding assembly according to the present invention.
Figure 21:
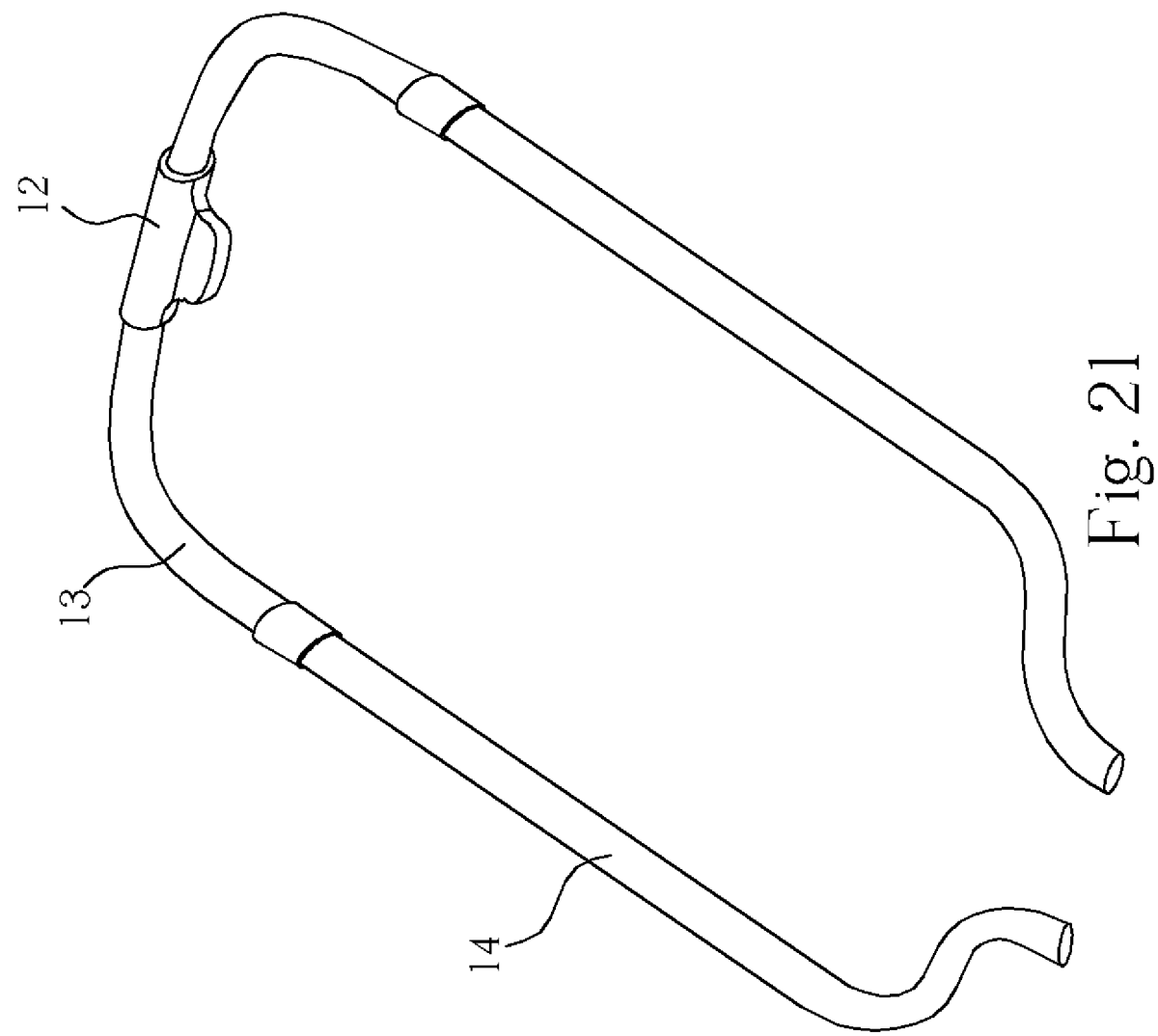
FIG. 21 and FIG. 22 are illustrations of the upper handle and the lower handle of the handle according to the present invention.
Figure 22:
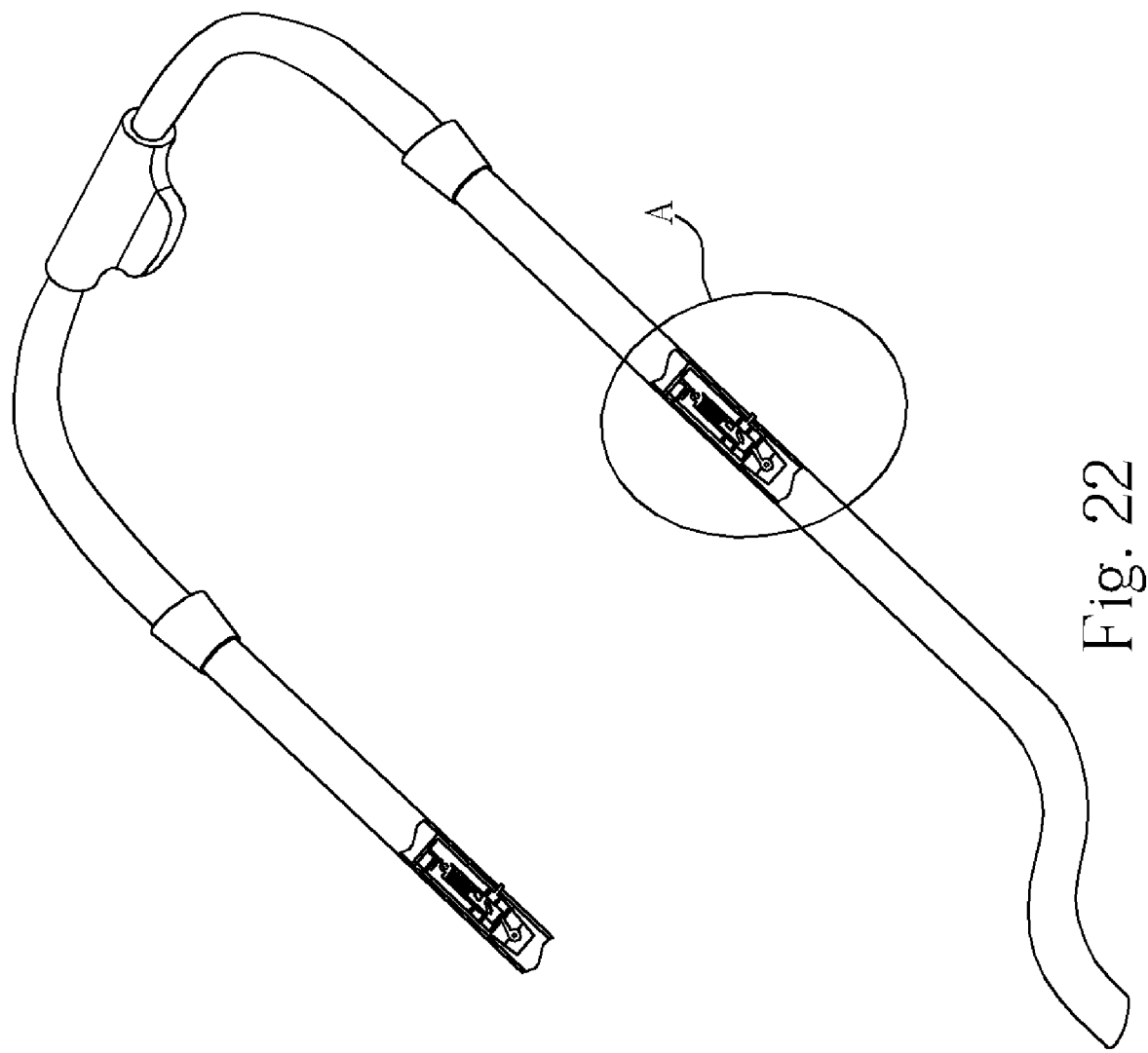

Please refer to FIG. 20. The present invention can further adjust the height of the seat 7 (or the bassinet 8) relative to the stroller frame 10 when installed in the stroller frame 10. The supporting device 71 of the seat 7 comprises a pressing device 72, two position pins 73, and two springs 74. The position pins 73 bias protrude from the outer wall of the supporting device 71 by the springs 74 respectively. The pressing device 72 connects with the position pin 73 and has a pair of cam slot to drive the position pin 73 to retract into the supporting device 71. Plurality position holes 211 are formed on the wall of the mounting slot 212 of the seat bracket 21 and arranged in different height. When the seat 7 is mounted within the mounting slot 212 of the seat bracket 21, the position pins 73 are pushed by the springs 74 to selectively engage with one of the position holes 211 to maintain the seat 7 at a certain height. To adjust the height of the seat 7, the position pins 73 disengage with the position holes 211 when the pressing device 72 is pressed and the seat 7 is then capable of moving vertically to another height. The spring 74 pushes the position pins 73 to engage with the position holes 211 at another height when releasing the pressing device 72 so that the seat 7 is maintained at the adjusted height. However, the height of the seat 7 can be adjusted until the supporting device 71 of the seat 7 reaches and abuts the bottom wall of the mounting slot 212 as FIG. 19 shows, while in this case, the position pins 73 need not engage with any of the position holes 211 at this position.

Figure 23:
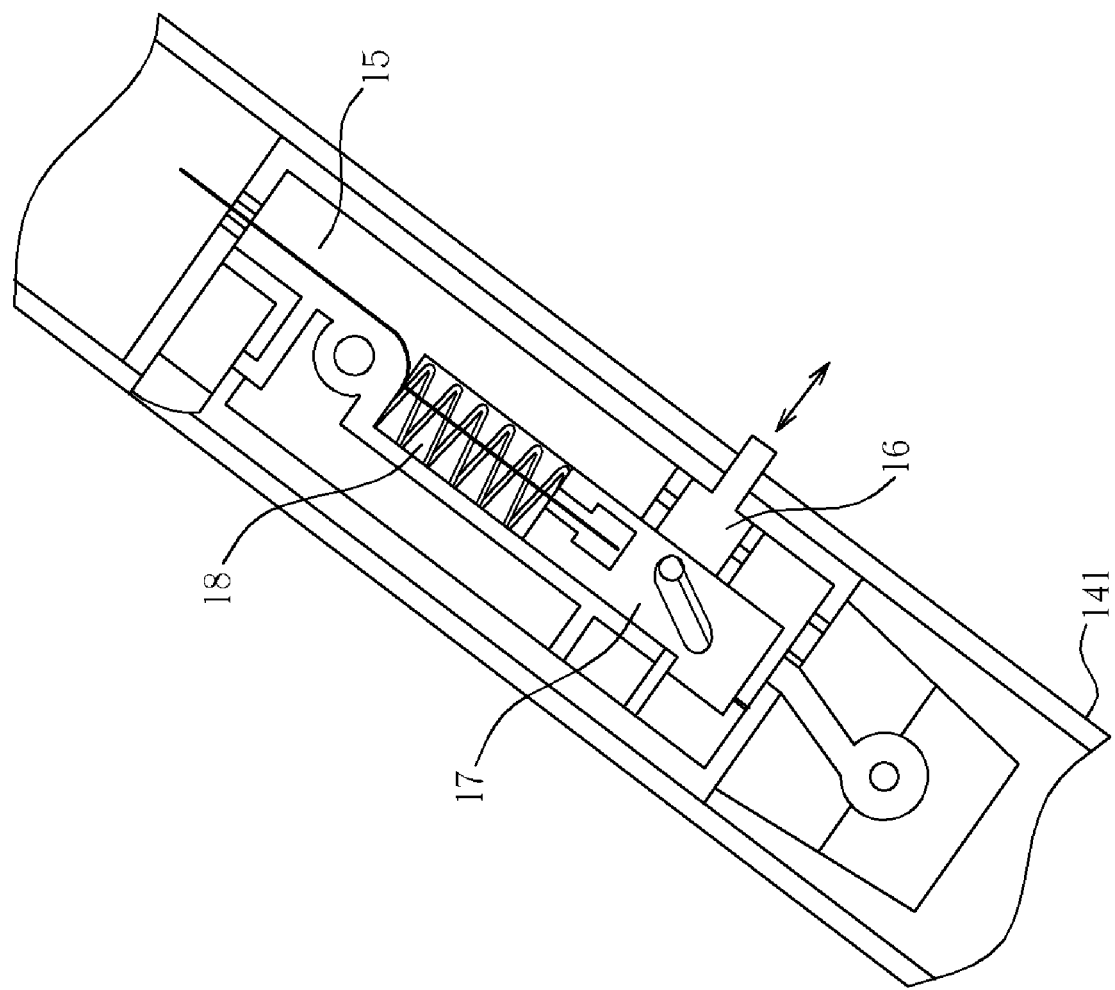
FIG. 23 and FIG. 24 are illustrations of a height-adjusting device of the handle according to the present invention.
Figure 24:
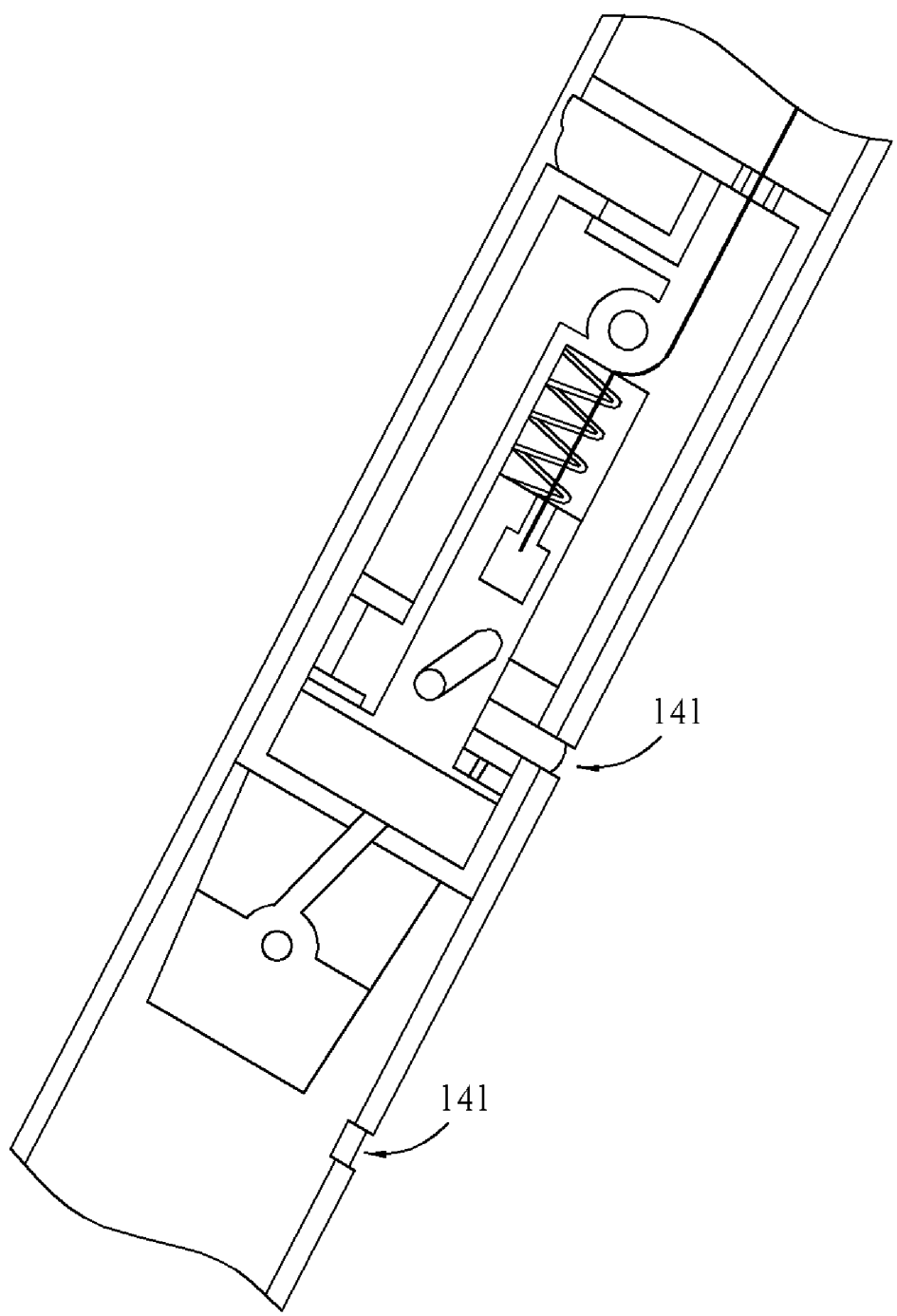

Please refer to FIG. 21 to FIG. 24. The handle 1 of the stroller frame 10 is height-adjustable as well. The handle 1 comprises an upper handle 13 and a lower handle 14, which are assembled together as shown in part A in FIG. 22. The lower handle 14 further comprises a plurality of position holes 141, the upper handle 13 comprises a linkage and a position pin 16, and the height of the handle 1 is adjusted when the position pin 16 inserts into one of the corresponding position holes 141. FIG. 23 and FIG. 24 are illustrations of different statuses of the upper handle 13 and the lower handle 14. The linkage comprises an operator 12, a connector 15 (for example, a steel wire, a copper wire, or an iron wire), a sliding device 17, and a spring 18. The operator 12 and the sliding device 17 connect with each other through the connector 15. To lock the upper handle 13 relative with the lower handle 14, the sliding device 17 is biased by the spring 18 so that the position pin 16 engages one of the position holes 141 of the lower handle 14. The upper handle 13 is unlocked from the lower handle 14 by operating the operator 12, pulling the sliding device 17 through the connector 15, and disengaging the position pin 16 from the stepping slot 141, and the upper handle 13 is therefore free to move relative to the lower handle 14. The position pin 16 then engages into another stepping slot 141 after the upper handle 13 is adjusted to a proper position, the operator 12 is no longer in operation, and therefore, the upper handle 13 is locked with the lower handle 14 again and the height of the handle 1 is adjusted.

The stroller frame 10 in the present invention utilizes a handle folding assembly 5 and a front frame folding assembly 6 for folding the stroller frame 10 into a compact, easy storing folded size. An axle 58 of the handle folding assembly 5 rotates when a wrench 51 is operated with single hand and two first sliders 55 are brought to approach axially to each other and detach from two fastening elements 54, making the handle 1 rotatable relative to the roller 57 and close to the rear frame 3. A button 61 of the front frame folding assembly 6 is pressed with single hand (or a seat 7 is detached from a seat bracket 21) to remove a second slider 62 (or 62') of the front frame 2 from a roller 57 to make the front frame 2 rotatable relative to the roller 57 and close to the rear frame 3. The single shaft folding assembly in the present invention solves the problem of complicated folding movements of strollers in the prior art with single hand operation. The position pins accompanied with a plurality of position holes enable the stroller an adjustable height of a seat and the handle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller, comprising:
   a handle comprising a handle sleeve;
   a front frame comprising a seat bracket for supporting a seat and a front sleeve connected to the seat bracket;
   a rear frame comprising a rear sleeve; and
   a folding assembly, comprising:
   a roller having a first position opening and at least a first slider movably mounted on the roller; and
   a fastening element fixed inside the handle sleeve;
   wherein the frame comprises a second slider movable within and retractable into the seat bracket, and roller passes through the handle sleeve, the front sleeve, and the rear sleeve for pivotally connecting to the handle, the front frame and the rear frame with each other, which allows the handle and the front frame for rotating relative to the rear frame around the roller respectively or being locked by engaging the first slider with the fastening elements or the second slider with the first position opening respectively.

2. The stroller of claim 1 wherein the first slider configured inside the roller and capable of sliding along an axis of the roller between a first position where the first slider protrudes from the roller and engages with the fastening element and a second position where the first slider retracts within the roller and disengages from the fastening element.

3. The stroller of claim 2 wherein the roller further comprises an inner guide on the inner wall of the roller, the fastening element is ring-shaped and comprises a fastening guide at inner wall, and the first slider comprises a teeth to move along the inner guide and operatively engage with the fastening guide of the fastening element when the first slider is in the first position.

4. The stroller of claim 2 wherein the folding assembly further comprises an axle configured at the axis of the roller and connected to the first slider for the first slider to slide on.

5. The stroller of claim 4 wherein the first slider further comprises a spiral groove, the axle further comprises a plurality of pins, each extending in the groove of the first slider, the plurality of pins guiding the first slider to move when the axle rotates.

6. The stroller of claim 2 wherein the folding assembly further comprises:
 a cover secured to the handle sleeve and comprising a ditch;
 an axle configured at the axis of the roller and connected to the first slider for bringing the plurality of first sliders to slide; and
 a safety lock secured to one end of the axle, the lock comprising a safety pin for engaging with the ditch to prevent the axle from rotating.

7. The stroller of claim 1 wherein the roller further comprises a second position opening, the second slider is configured inside the front sleeve, the front frame locked in a folded position when the second slider engages with the second position opening.

8. The stroller of claim 7 wherein the folding assembly further comprises a button operatively mounted on the seat bracket and connected to the second slider for bringing the second slider to detach from one of the position openings.

9. The stroller of claim 1, further comprising a seat comprising a supporting device, the seat bracket of the front frame having a plurality of position holes and an opening, and the second slider moveably protruding from the opening, the supporting device capable of pushing the second slider to engage with the first position opening when the supporting device of the seat is configured in the seat bracket.

10. The stroller of claim 9 wherein the supporting device comprises:
 a position pin for detachably engaging with one of the plurality of position holes; and
 a pressing device connecting to the position pin for bringing the position pin to detach from one of the plurality of position holes.

11. The stroller of claim 1 wherein the rear sleeve comprises a rear guide and the roller comprises a guider on the outer wall of the roller, the roller joining the rear sleeve by engaging the guider with the rear guide.

12. The stroller of claim 1 wherein the folding assembly further comprises an elastic element, the first slider connecting with one end of the elastic member.

13. The stroller of claim 1 wherein the handle comprises:
 a lower handle comprising the handle sleeve and a plurality of position holes; and
 an upper handle, comprising:
  a position pin for detachable engaging with one of the plurality of position holes; and
  a linkage linking to the position pin for bringing the position pin to detach from one of the plurality of position holes.

14. A stroller frame, comprising:
 a front frame;
 a rear frame; and
 a handle, comprising:
  a roller secured to the rear frame, the handle and the front frame pivotally connecting to the rear frame via the roller respectively and capable of rotating relative to the rear frame around the roller;
  a first locking device mounted on the roller and movable relative to the roller between a first position where the first locking device is engaged with the handle and a second position where the first locking device is disengaged from the handle; and
  a second locking device mounted on the front frame and movable relative to the front frame between an engaged position where the second locking device is locked with the roller and a disengaged position where the second locking device is removed from the roller.

15. The stroller frame of claim 14, wherein the first locking device comprises a plurality of fastening elements respectively fixed inside the handle and a plurality of first sliders configured inside the roller and capable of sliding along the axis of the roller, the plurality of first sliders moving to the first position for engaging respectively with the plurality of fastening elements for locking the handle and the rear frame or moving to the second position for disengaging respectively from the plurality of fastening elements for allowing the handle capable of rotating relative to the rear frame around the roller.

16. The stroller frame of claim 15, wherein the roller further comprises:
 an elastic element having two ends connecting with the plurality of first sliders respectively; and
 an axle configured at the axis of the roller for bringing the plurality of first sliders to slide.

17. The stroller frame of claim 16 wherein each of the plurality of first sliders further comprises a groove, the axle further comprises a plurality of pins, each extending in the groove of the first slider, the plurality of pins guiding the plurality of first sliders to approach to each other by means of the groove when the axle rotates.

18. The stroller frame of claim 14, wherein the roller comprises a plurality of position openings and the second locking device is in the engaged position when locked with one of the plurality of position openings of the roller.

19. The stroller frame of claim 18 wherein the plurality of position openings comprises a first position opening and a second position opening, the front frame locked in an extending position when the second locking device engages with the first position opening and in a folded position when the second locking device engages with the second position opening.

* * * * *